US010348147B2

(12) United States Patent
Sugishima et al.

(10) Patent No.: US 10,348,147 B2
(45) Date of Patent: Jul. 9, 2019

(54) ROTATING ARMATURE, ROTATING ELECTRIC MACHINE COMPRISING A PLURALITY OF COIL PORTIONS, AND ROTATING ARMATURE MANUFACTURING METHOD

(71) Applicant: ASMO CO., LTD., Kosai, Shizuoka-pref. (JP)

(72) Inventors: Kazushi Sugishima, Hamamatsu (JP); Tetsuji Yoshikawa, Hamamatsu (JP)

(73) Assignee: DENSO CORPORATION, Aichi-pref. (JP)

( * ) Notice: Subject to any disclaimer, the term of this patent is extended or adjusted under 35 U.S.C. 154(b) by 476 days.

(21) Appl. No.: 14/970,542

(22) Filed: Dec. 16, 2015

(65) Prior Publication Data

US 2016/0181880 A1 Jun. 23, 2016

(30) Foreign Application Priority Data

Dec. 18, 2014 (JP) .................................. 2014-256096
Nov. 30, 2015 (JP) .................................. 2015-233874

(51) Int. Cl.
*H02K 3/28* (2006.01)
*H01R 39/04* (2006.01)
*H02K 23/30* (2006.01)

(52) U.S. Cl.
CPC .............. *H02K 3/28* (2013.01); *H01R 39/04* (2013.01); *H02K 23/30* (2013.01)

(58) Field of Classification Search
CPC ...... H01R 39/04; H02K 13/006; H02K 13/04; H02K 13/08; H02K 3/28; H02K 3/50; H02K 23/30

(Continued)

(56) References Cited

U.S. PATENT DOCUMENTS

2006/0244334 A1* 11/2006 Furui .................... H02K 15/09
310/198
2006/0273681 A1* 12/2006 Durham ................ H02K 29/03
310/180

(Continued)

FOREIGN PATENT DOCUMENTS

| CN | 1855674 A | 11/2006 |
| JP | 2009124850 A | 6/2009 |
| JP | 1987628 B2 | 7/2012 |

OTHER PUBLICATIONS

English language translation of the following: Office action dated Nov. 26, 2018 from the SIPO in a Chinese patent application No. 201510944903.X corresponding to the instant patent application. This office action translation is submitted now in order to supplement the understanding of the cited referecne which is being disclosed in the instant Information Disclosure Statement.

(Continued)

*Primary Examiner* — Michael Andrews
(74) *Attorney, Agent, or Firm* — Solaris Intellectual Property Group, PLLC

(57) ABSTRACT

In a rotating armature, the numbers of teeth straddled by each of plural coil portions are all the same as each other, three. In plural windings that form the plural coil portions, three individual coil portions that, out of the plural coil portions, are disposed at uniform intervals around the circumferential direction of the armature core and are connected together in series are formed in each of the windings. In each of the windings including the three individual coil portions, one segment out of the plural segments is connected to another segment that has the same phase as the one segment out of the plural segments.

5 Claims, 50 Drawing Sheets

(58) Field of Classification Search
USPC .......................................................... 310/203
See application file for complete search history.

(56) References Cited

U.S. PATENT DOCUMENTS

2008/0231137 A1* 9/2008 Sugishima ............. H02K 23/30
310/197
2008/0258574 A1* 10/2008 Santo ..................... H02K 13/08
310/177

OTHER PUBLICATIONS

English language translation of the following: Office action dated May 28, 2019 from the JPO in a Japanese patent application No. 2015-233874 corresponding to the instant patent application.

* cited by examiner

FIG.7
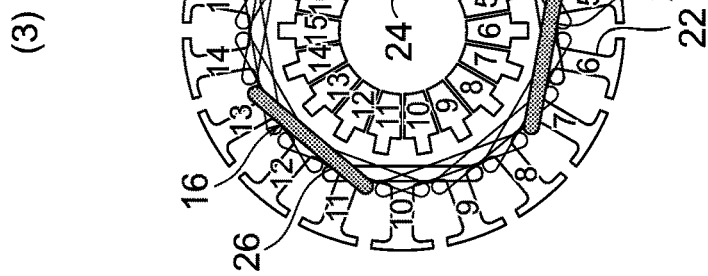
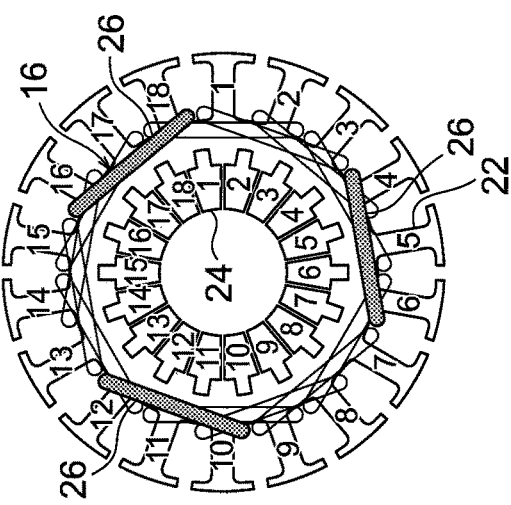
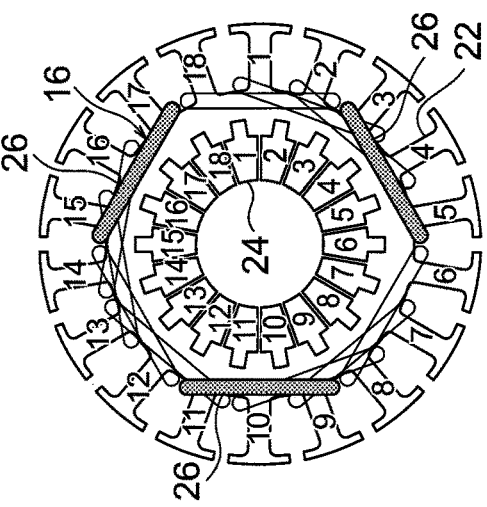

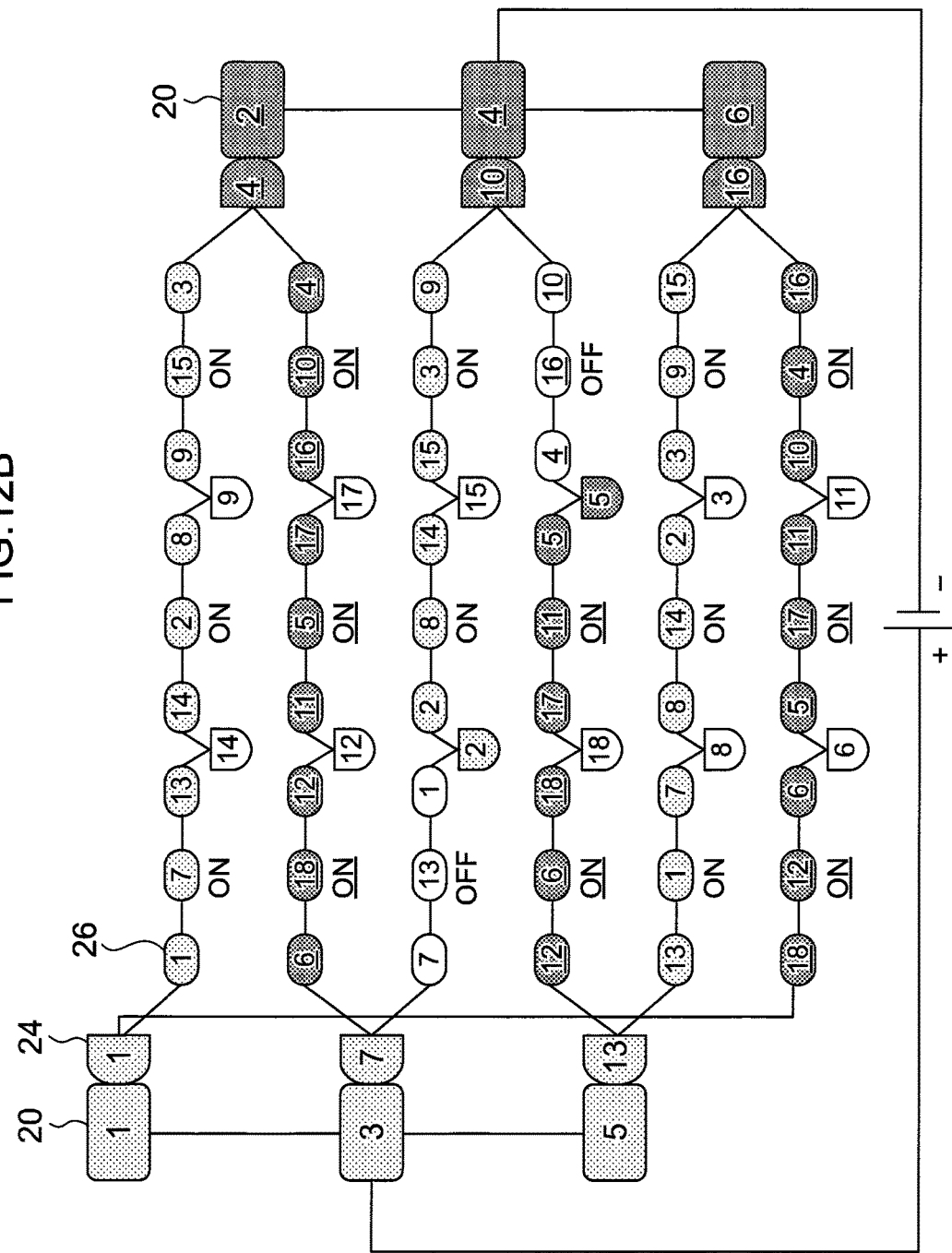

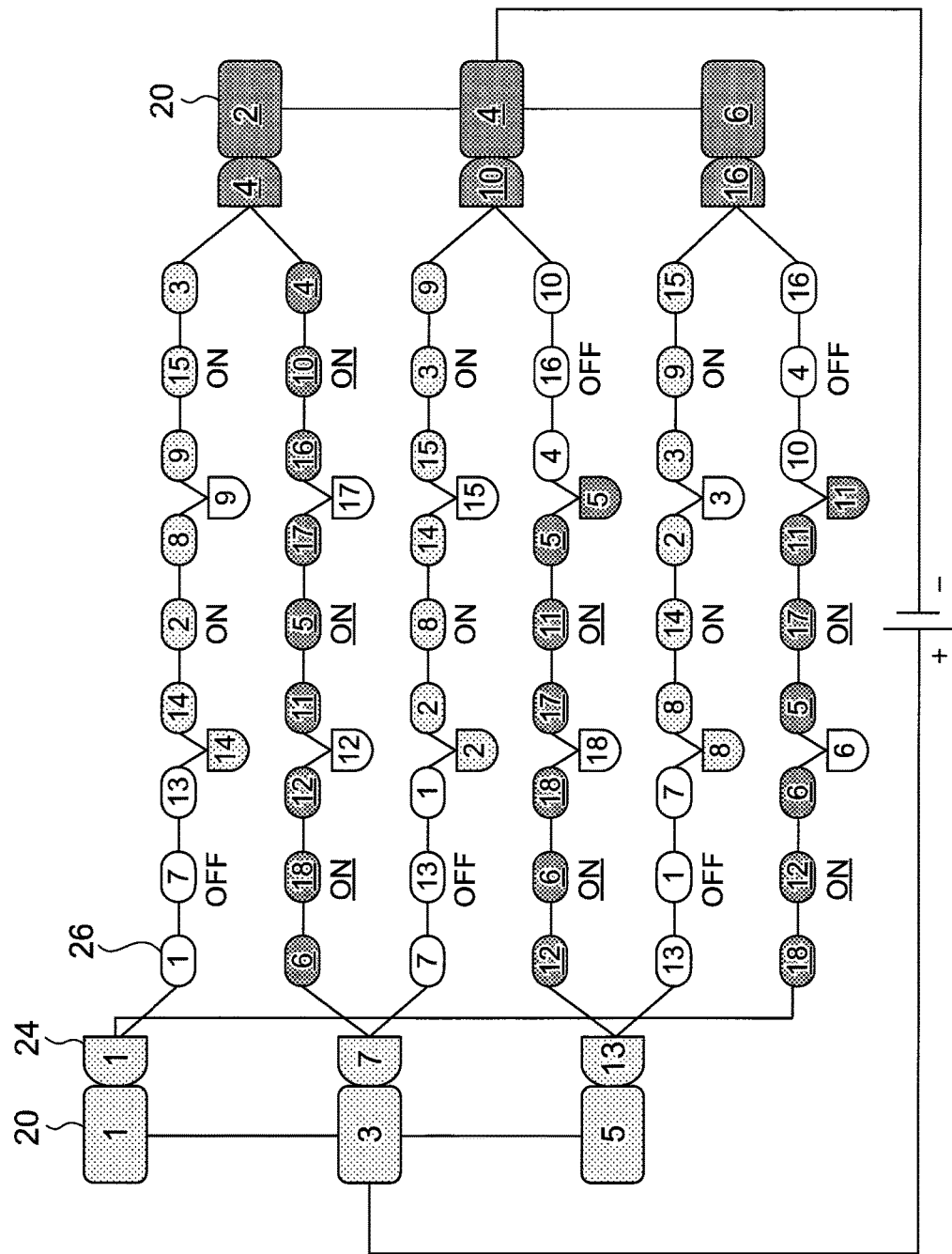

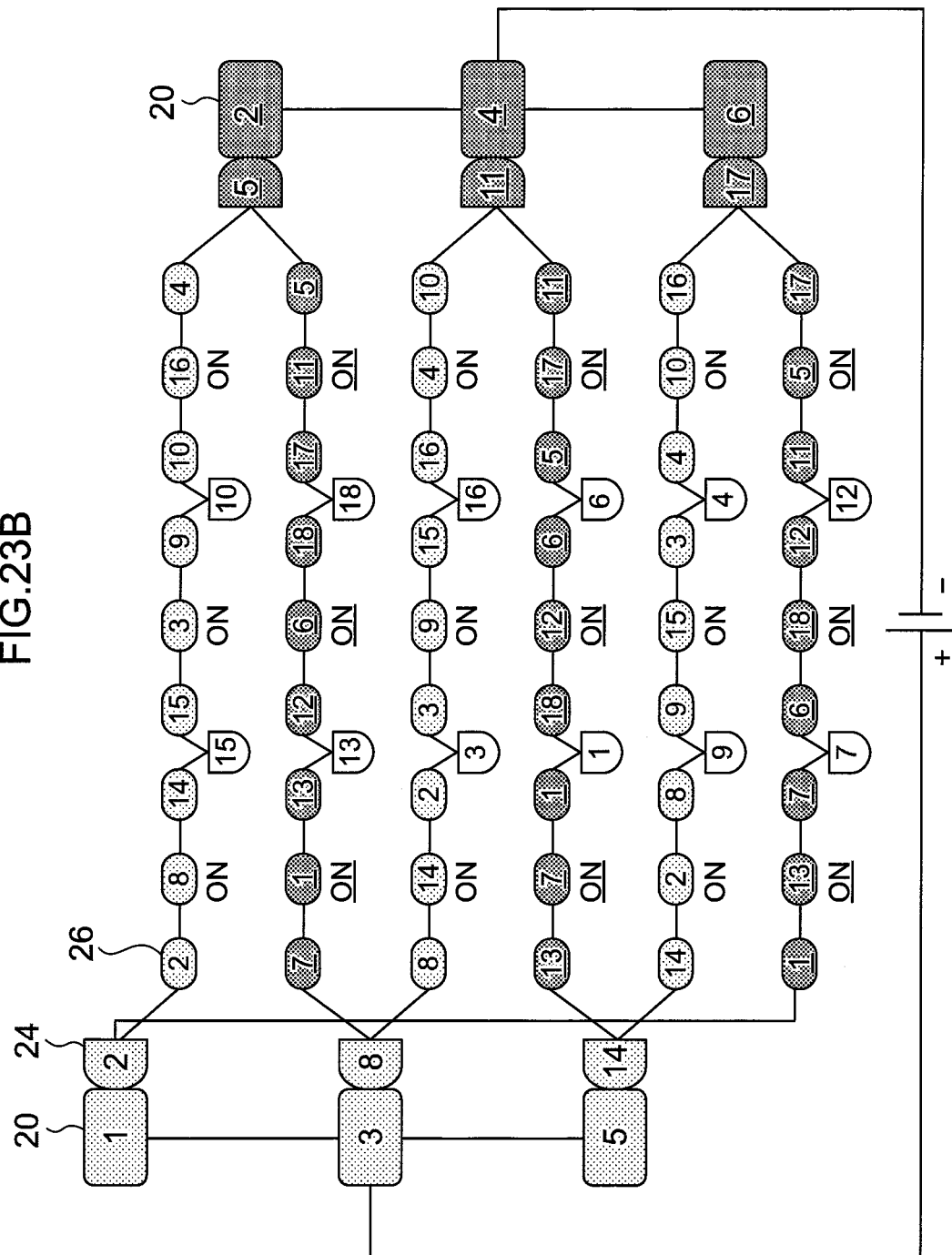

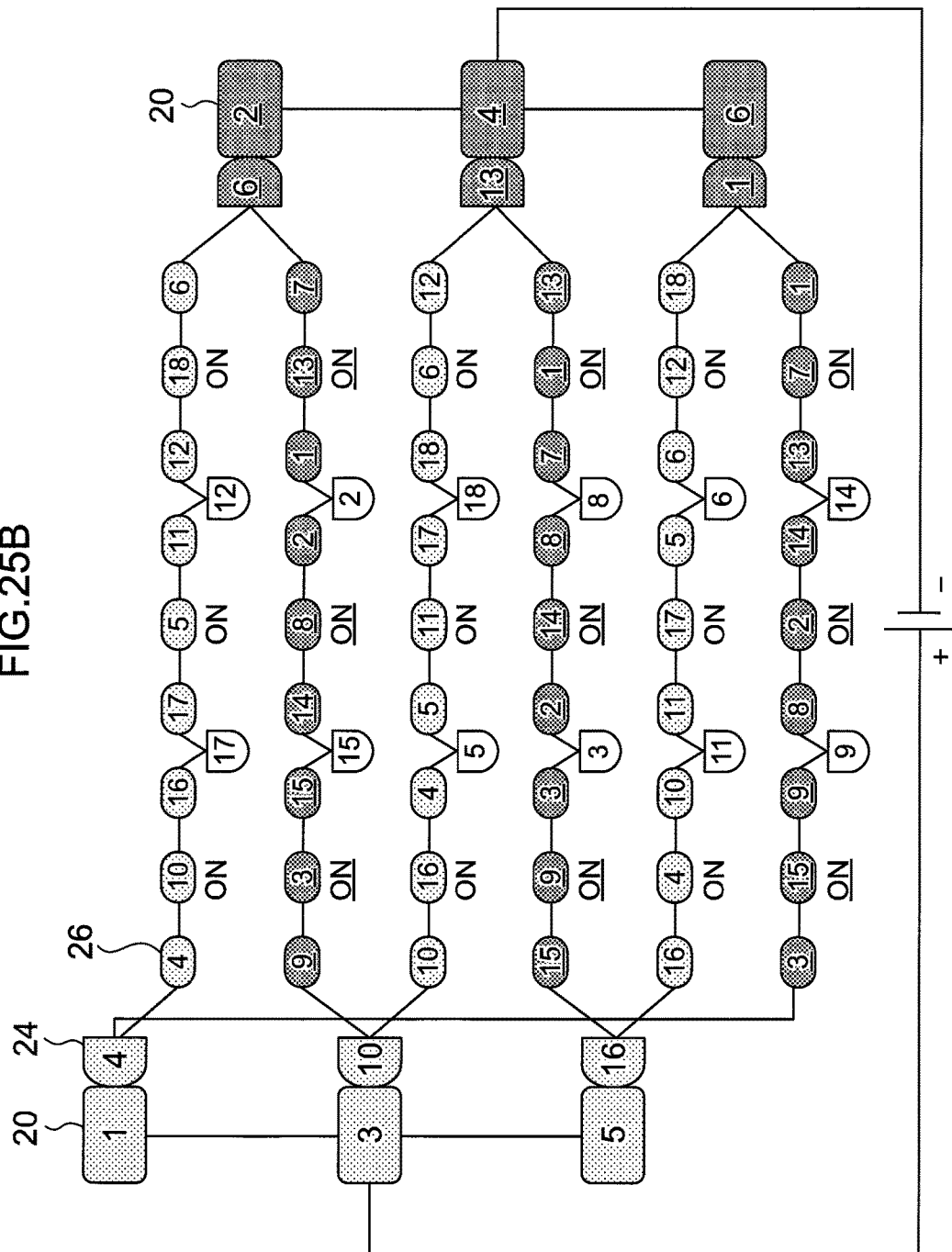

ROTATING ARMATURE, ROTATING ELECTRIC MACHINE COMPRISING A PLURALITY OF COIL PORTIONS, AND ROTATING ARMATURE MANUFACTURING METHOD

CROSS-REFERENCE TO RELATED APPLICATION

This application is based on and claims priority under 35 USC 119 from Japanese Patent Application No. 2014-256096 filed on Dec. 18, 2014, and Japanese Patent Application No. 2015-233874 filed on Nov. 30, 2015, the disclosures of which are incorporated by reference herein.

TECHNICAL FIELD

The present invention relates to a rotating armature, a rotating electric machine, and a rotating armature manufacturing method.

RELATED ART

Hitherto, rotating armatures exist that include an armature core having plural teeth at intervals of a uniform angle, a commutator that is disposed coaxially with the armature core and that has plural segments arranged around the circumferential direction, and plural coil portions that are each wound plural times around and across (straddling) plural of the teeth out of the plural teeth, and that are wound overlapping such that adjacent coil portions in the circumferential direction of the armature core partially overlap with each other (see, for example, Japanese Patent No. 4987628 (Patent Document 1)).

In the above rotating armature, current is commutated by plural brushes brushing against the plural segments provided to the commutator. There is a concern of an imbalance arising in the magnetic fields in the plural coil portions if misalignment occurs in commutation timing between the plural brushes. Such an imbalance in the magnetic fields is a cause of vibration and noise during rotation of the rotating armature.

A method that is sometimes employed to suppress an imbalance arising in the magnetic fields in the plural coil portions is to connect one segment out of the plural segments with another segment that is in the same phase as the one segment using a voltage equalizer line, a voltage equalizer member, or the like.

However, as well as increasing the number of members and increasing costs, such methods cause excessive current at the brush where switching occurs first. Such excessive current in the brush is a cause of reduced brush lifespan.

SUMMARY

In consideration of the above circumstances, an object of the present invention is to provide a rotating armature, a rotating electric machine, and a rotating armature manufacturing method capable of suppressing an imbalance in magnetic fields and excessive current to brushes, while suppressing an increase in costs.

A rotating armature of the present invention includes: an armature core including plural teeth disposed at uniform angle intervals; a commutator that is disposed coaxially to the armature core and that includes plural segments arranged around a circumferential direction; and plural coil portions that are each wound plural times straddling plural individual teeth out of the plural teeth, and that are wound such that adjacent coil portions in the circumferential direction of the armature core partially overlap with each other; wherein, a number of slots between the plural teeth is m×n, when m is the number of plural magnetic poles provided at a periphery of the armature core, and n is a natural number; each of the plural coil portions straddles the same number of individual teeth; in plural windings that form the plural coil portions, plural individual coil portions that, out of the plural coil portions, are disposed at uniform intervals around the circumferential direction of the armature core and are connected together in series are formed in each of the windings; and each of the windings including the plural individual coil portions is connected to one segment out of the plural segments, and to another segment that has the same phase as the one segment out of the plural segments.

The rotating electric machine of the present invention includes the rotating armature of the present invention, plural magnetic poles provided at the periphery of the armature core, and plural brushes that brush against the plural segments.

A manufacturing method for a rotating armature of the present invention is a manufacturing method for a rotating armature including an armature core including plural teeth disposed at uniform angle intervals, a commutator that is disposed coaxially to the armature core and that includes plural segments arranged around a circumferential direction, and plural coil portions that are each wound plural times straddling plural individual teeth out of the plural teeth, and that are wound such that adjacent coil portions in the circumferential direction of the armature core partially overlap with each other, wherein, a number of slots between the plural teeth is m×n, when m is the number of plural magnetic poles provided at a periphery of the armature core, and n is a natural number. The rotating armature manufacturing method includes: forming plural individual coil portions such that each of the plural coil portions straddles the same number of individual teeth, and such that, in plural windings that form the plural coil portions, plural individual coil portions that, out of the plural coil portions, are disposed at uniform intervals around the circumferential direction of the armature core and are connected together in series are formed in each of the windings; and connecting each of the windings including the plural individual coil portions such that one segment out of the plural segments is connected to another segment that has the same phase as the one segment out of the plural segments.

The above rotating armature, rotating electric machine, and rotating armature manufacturing method of the present invention enable an imbalance in magnetic fields and excessive current to brushes to be suppressed, while suppressing an increase in costs.

BRIEF DESCRIPTION OF DRAWINGS

An exemplary embodiment of the present invention will be described in detail based on the following figures, wherein:

FIG. 7 is an explanatory diagram illustrating a manufacturing method (single winding) of a rotating armature of the present exemplary embodiment.

FIG. 12B is an explanatory diagram illustrating operation of a rotating armature of the present exemplary embodiment.

FIG. 15B is an explanatory diagram illustrating operation of a rotating armature of the present exemplary embodiment.

FIG. 23B is an explanatory diagram illustrating operation of a rotating armature of the present exemplary embodiment.

FIG. 25B is an explanatory diagram illustrating operation of a rotating armature of the present exemplary embodiment.

DETAILED DESCRIPTION

Explanation follows regarding an exemplary embodiment of the present invention.

Figure 1:
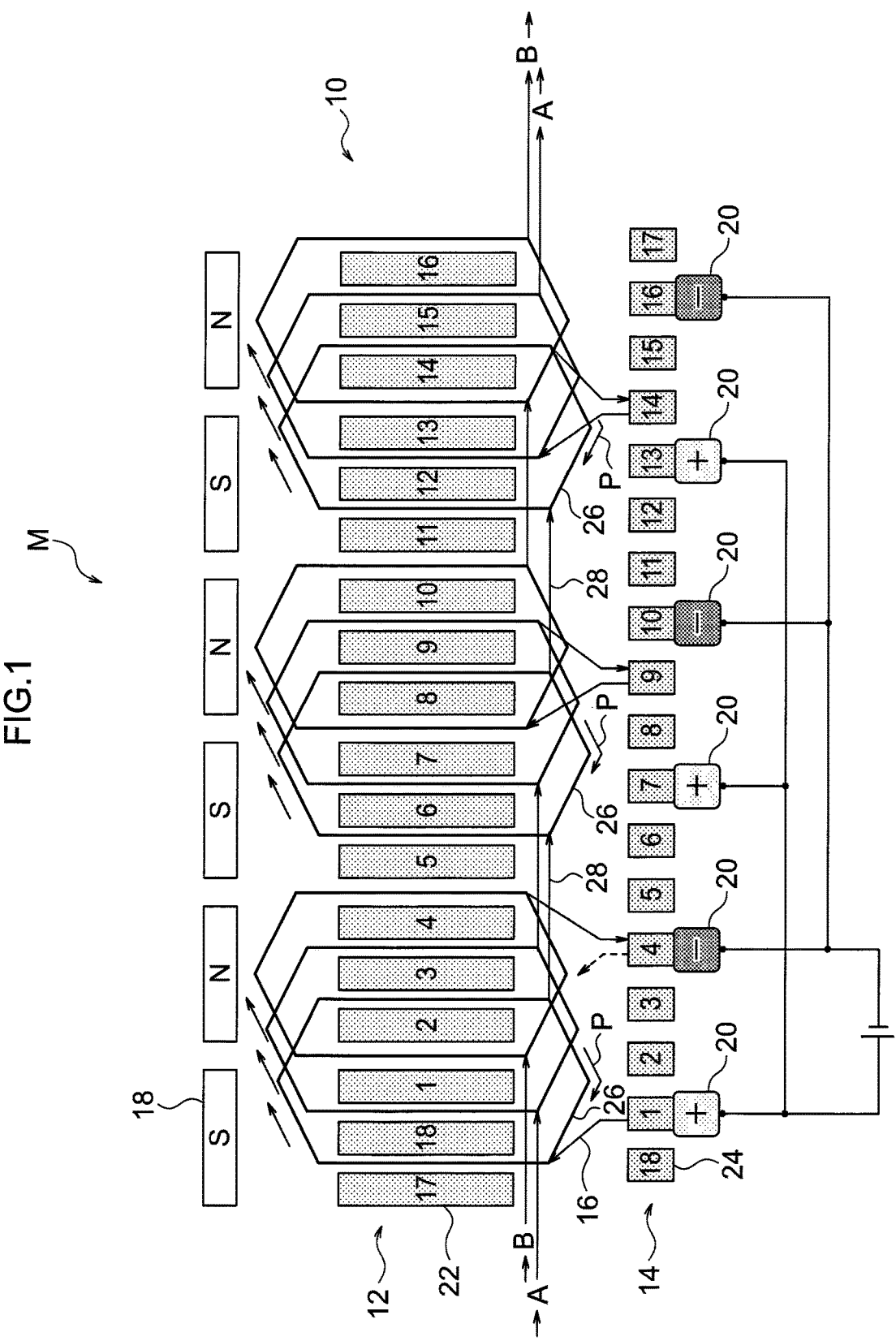
FIG. 1 is a configuration diagram illustrating a rotating electric machine of an exemplary embodiment.

FIG. 1 illustrates configuration elements of a rotating electric machine M of the present exemplary embodiment arranged side-by-side in a straight line. As illustrated in FIG. 1, the rotating electric machine M of the present exemplary embodiment includes an armature core 12, a commutator 14, plural windings 16, plural magnetic poles 18, and plural brushes 20. The armature core 12, the commutator 14, and the plural windings 16 configure a rotating armature 10. The plural magnetic poles 18 are provided at the periphery of the armature core 12.

Figure 2:
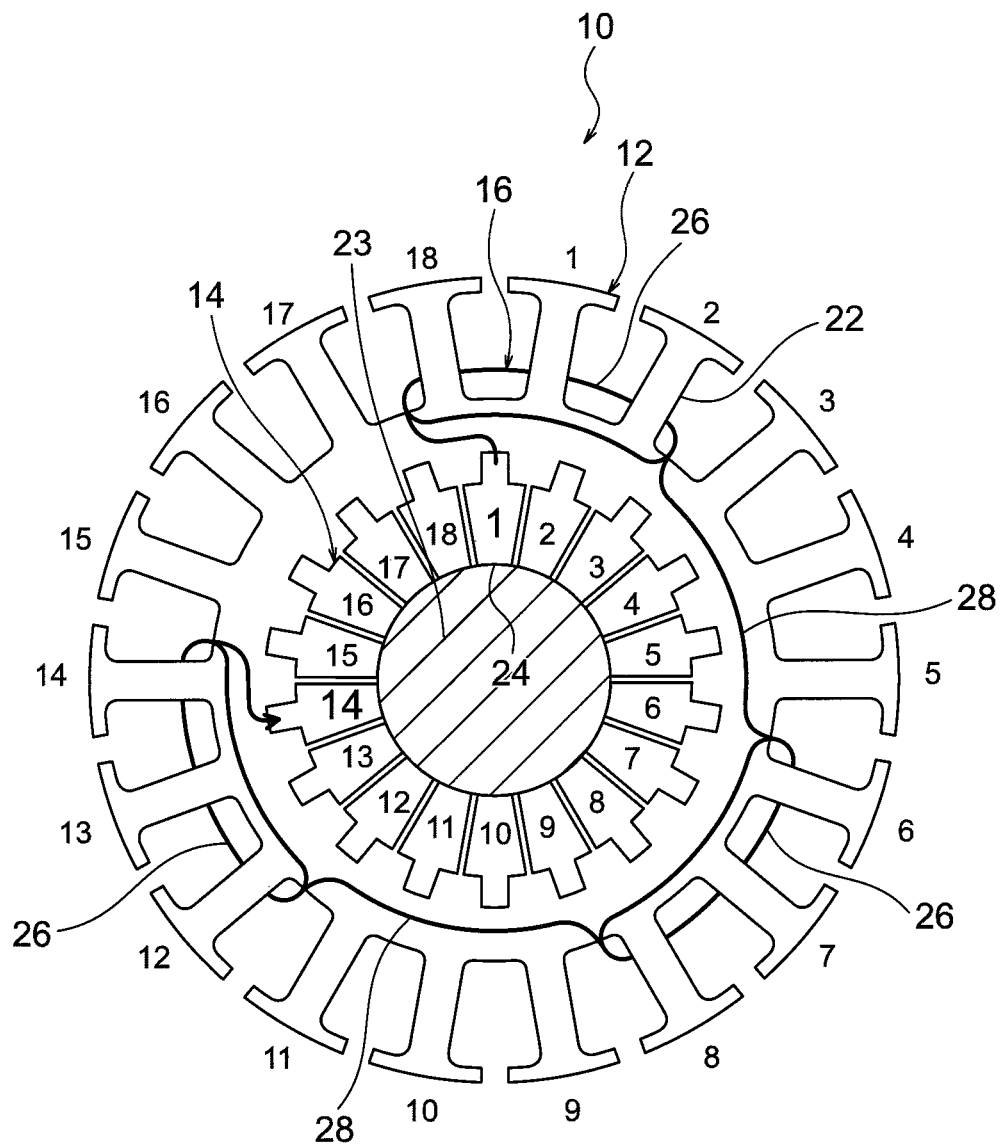
FIG. 2 is a drawing viewed along an axial direction of a rotating armature of the present exemplary embodiment.

The armature core 12 includes plural teeth 22. As illustrated in FIG. 2, the plural teeth 22 are formed in a radial pattern centered on an axial center portion of the armature core 12, and are arranged in a row at uniform angle intervals. The commutator 14 is fixed, together with the armature core 12, to a shaft 23, and is disposed coaxially to the armature core 12. The commutator 14 includes plural segments 24 arrayed around a circumferential direction. The configuration of the plural windings 16 is explained later, together with the winding method thereof (the manufacturing method of the rotating armature).

As an example, the rotating electric machine M of the present exemplary embodiment illustrated in FIG. 1 is a 6-pole 18-slot type, and is provided with six of the magnetic poles 18 and eighteen of the teeth 22. A slot is configured between each of the teeth 22. Each of the plural magnetic poles 18 is either an "S pole" or an "N pole", and the "S poles" and the "N poles" are arrayed alternately around the circumferential direction. The number of the segments 24 provided is the same as the number of the teeth 22, namely eighteen. The number of the plural brushes 20 provided is the same as the number of the magnetic poles 18, namely six. The plural brushes 20 brush against the plural segments 24. The plural brushes 20 are classified into positively poled brushes and negatively poled brushes. In FIGS. 1 and 2, the plural teeth 22 and the plural segments 24 are each labelled with the numbers 1 to 18.

Next, explanation follows regarding a manufacturing method of the rotating electric machine of the present exemplary embodiment.

A double flyer is employed to wind the windings 16 in the manufacturing method of the rotating electric machine of the present exemplary embodiment. FIG. 1 is a diagram illustrating one side in a case in which a double flyer is employed. FIG. 1 is moreover a diagram in which the double flyer starts winding the windings 16 from the segment "1" on the one side. The double flyer also starts winding the windings from the segment "10" on the other side (a facing position at 180°).

First, as illustrated in FIG. 1, one end of a winding 16 is connected to the segment "1", and the winding 16 is wound plural times around and across (straddling) the three teeth "18, 1, 2" to form a first coil portion 26. The other end of the winding 16 is then not connected back to a segment, and instead is wound plural times straddling the three teeth "6, 7, 8" to form a second coil portion 26. Similarly, the other end of the winding 16 is then not connected back to a segment, and instead is wound plural times straddling the three teeth "12, 13, 14" to form a third coil portion 26. In the present exemplary embodiment, three of the coil portions 26 are formed in this manner, connected together in series along a single winding 16. The other end of the winding 16 is connected to the segment "14" that has the same phase as the segment "2".

Then, starting at the segment 24 to which the other end of the first winding 16 is connected, this being segment 1, the next winding is wound based on similar principles to the first winding 16. The above operation is repeated nine times when a double flyer is employed. FIG. 1 illustrates a state in which the first winding to the third winding have been wound based on the principles described above. FIG. 2 illustrates a wound state of the first winding 16 that includes three of the coil portions 26 connected together in series.

Figure 3:
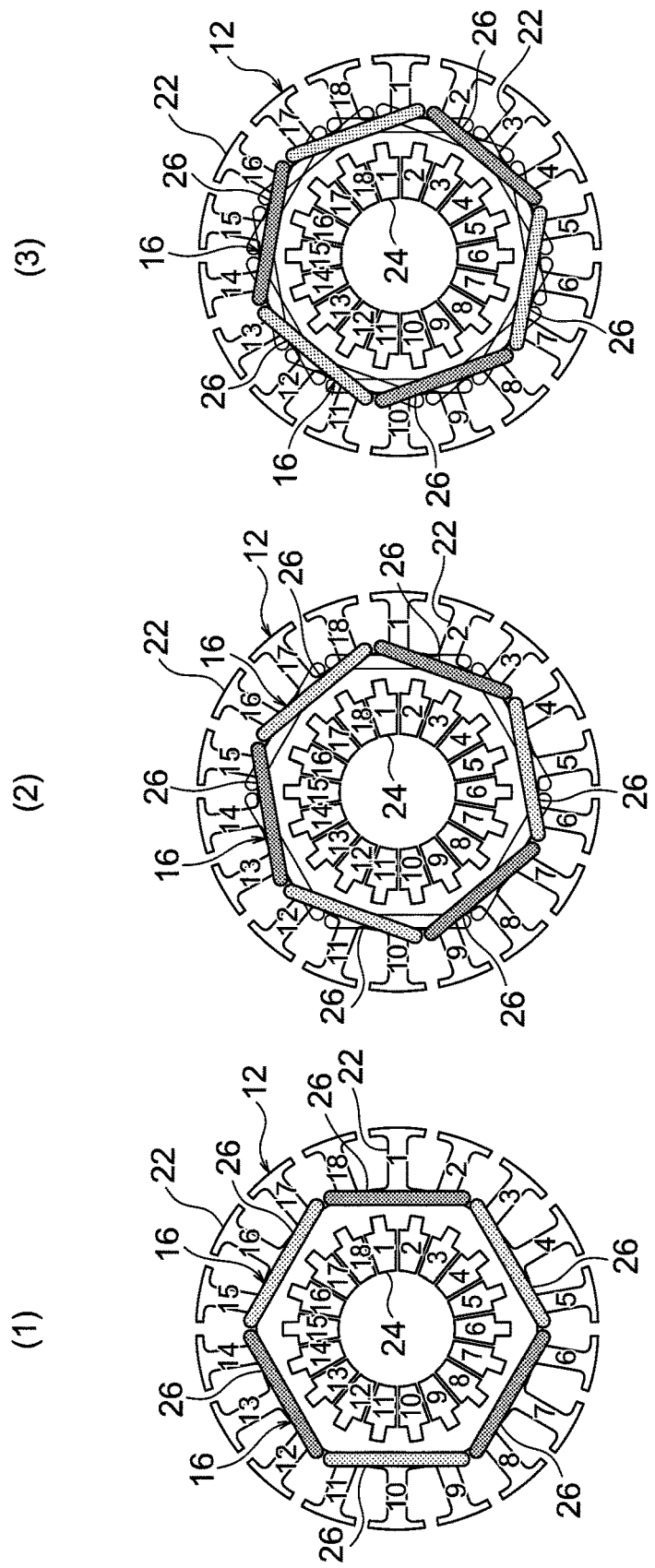
FIG. 3 is an explanatory diagram illustrating a manufacturing method (double winding) of a rotating armature of the present exemplary embodiment.
Figure 4:
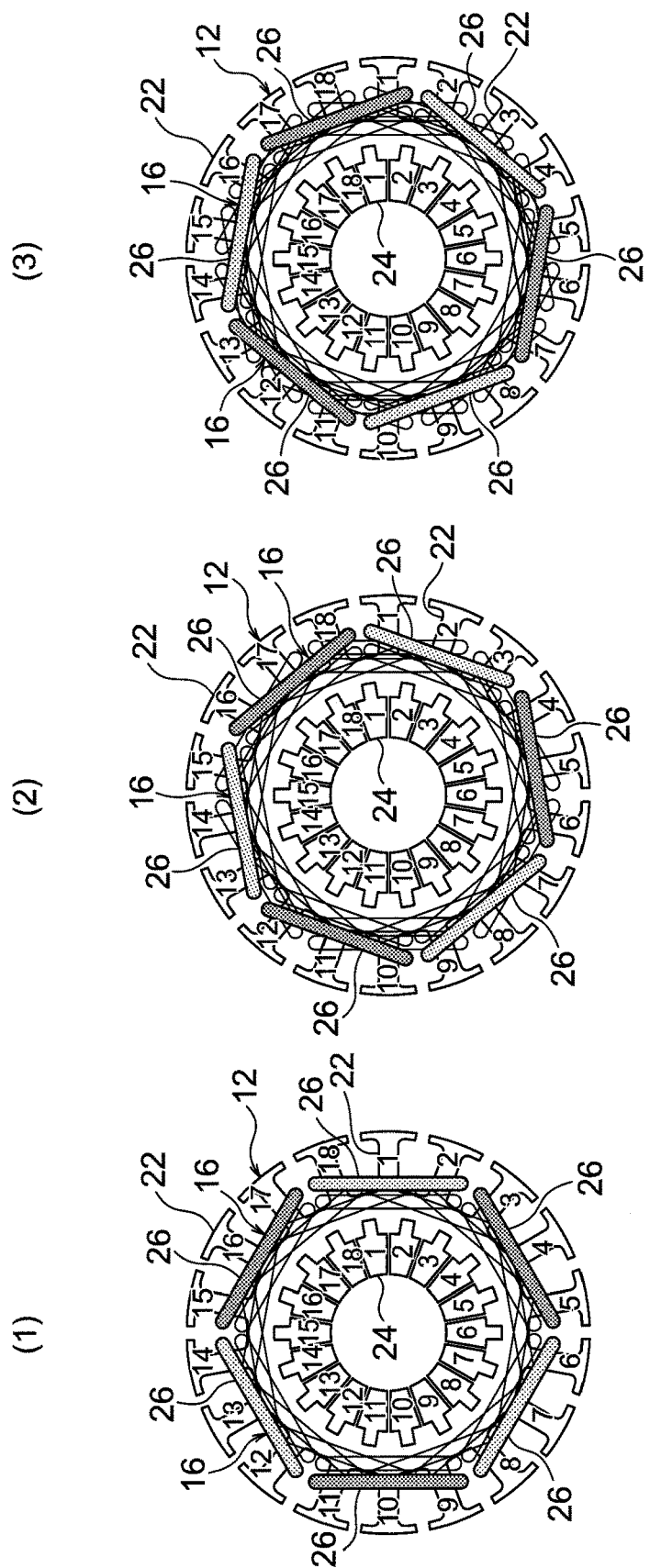
FIG. 4 is an explanatory diagram illustrating a manufacturing method (double winding) of a rotating armature of the present exemplary embodiment.
Figure 5:
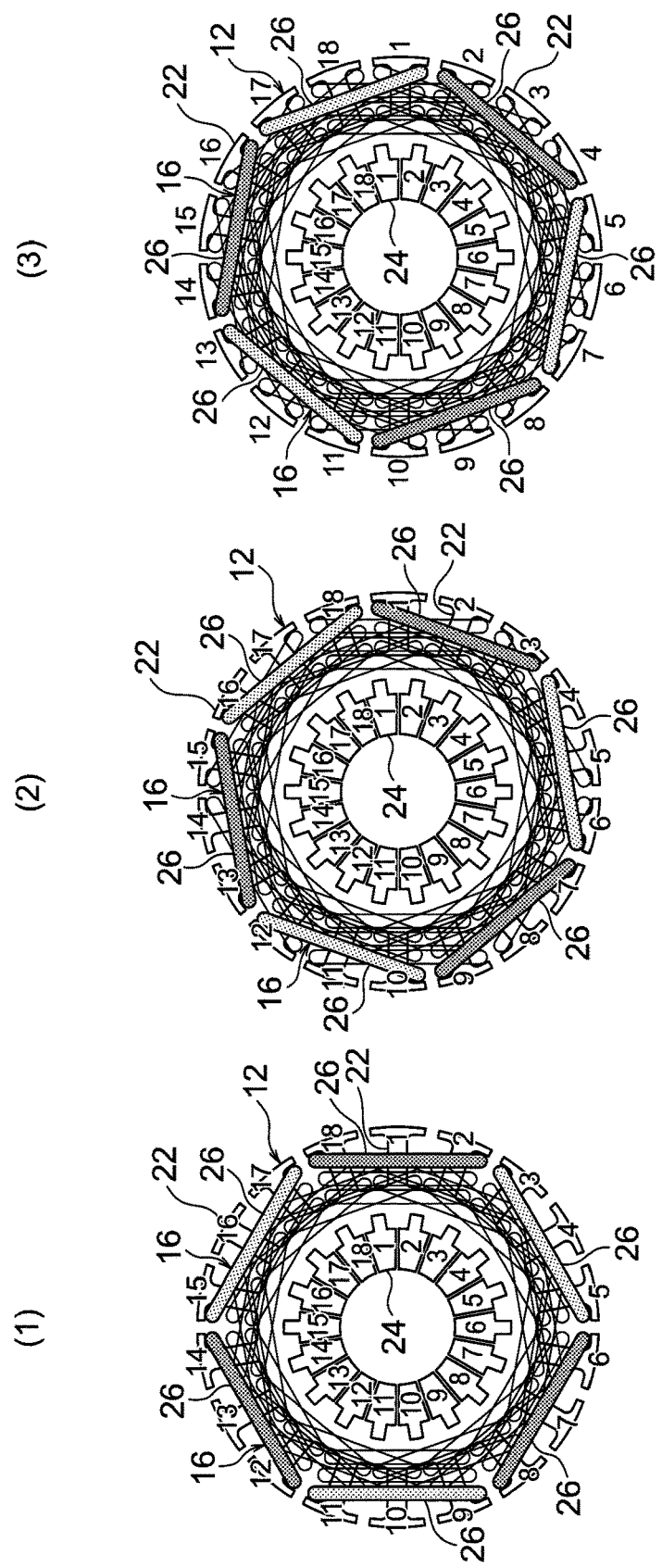
FIG. 5 is an explanatory diagram illustrating a manufacturing method (double winding) of a rotating armature of the present exemplary embodiment.

FIG. 3 to FIG. 5 illustrate winding of 18 windings in sequence using a double flyer based on the principles described above. In FIG. 3 to FIG. 5, the heavily shaded coil portions 26 are coil portions 26 formed by the one side of the double flyer, and the lightly shaded coil portions 26 are coil portions 26 formed by the other side of the double flyer.

FIG. 3(1) illustrates a first set, in which a coil portion 26 straddling the teeth "18, 1, 2", a coil portion 26 straddling the teeth "6, 7, 8", and a coil portion 26 straddling the teeth "12, 13, 14" are formed as three coil portions connected together in series by the one side of the double flyer. A coil portion 26 straddling the teeth "9, 10, 11", a coil portion 26 straddling the teeth "15, 16, 17", and a coil portion 26 straddling the teeth "3, 4, 5" are formed as three coil portions connected together in series by the other side of the double flyer.

FIG. 3(2) illustrates a second set, in which a coil portion 26 straddling the teeth "13, 14, 15", a coil portion 26 straddling the teeth "1, 2, 3", and a coil portion 26 straddling the teeth "7, 8, 9" are formed as three coil portions connected together in series by the one side of the double flyer. A coil portion 26 straddling the teeth "4, 5, 6", a coil portion 26 straddling the teeth "10, 11, 12", and a coil portion 26 straddling the teeth "16, 17, 18" are formed by the other side of the double flyer as three coil portions connected together in series.

FIG. 3(3) illustrates a third set, in which a coil portion 26 straddling the teeth "8, 9, 10", a coil portion 26 straddling the teeth "14, 15, 16", and a coil portion 26 straddling the teeth "2, 3, 4" are formed as three coil portions connected together in series by the one side of the double flyer. A coil portion 26 straddling the teeth "17, 18, 1", a coil portion 26 straddling the teeth "5, 6, 7", and a coil portion 26 straddling the teeth "11, 12, 13" are formed by the other side of the double flyer as three coil portions connected together in series.

FIG. 4(1) illustrates a fourth set, in which a coil portion 26 straddling the teeth "3, 4, 5", a coil portion 26 straddling the teeth "9, 10, 11", and a coil portion 26 straddling the teeth "15, 16, 17" are formed by the one side of the double flyer as three coil portions connected together in series. A coil portion 26 straddling the teeth "12, 13, 14", a coil portion 26 straddling the teeth "18, 1, 2", and a coil portion 26 straddling the teeth "6, 7, 8" are formed by the other side of the double flyer as three coil portions connected together in series.

FIG. 4(2) illustrates a fifth set, in which a coil portion 26 straddling the teeth "16, 17, 18", a coil portion 26 straddling the teeth "4, 5, 6", and a coil portion 26 straddling the teeth "10, 11, 12" are formed by the one side of the double flyer as three coil portions connected together in series. A coil portion 26 straddling the teeth "7, 8, 9", a coil portion 26 straddling the teeth "13, 14, 15", and a coil portion 26 straddling the teeth "1, 2, 3" are formed by the other side of the double flyer as three coil portions connected together in series.

FIG. 4(3) illustrates a sixth set, in which a coil portion 26 straddling the teeth "11, 12, 13", a coil portion 26 straddling the teeth "17, 18, 1", and a coil portion 26 straddling the teeth "5, 6, 7" are formed by the one side of the double flyer as three coil portions connected together in series. A coil portion 26 straddling the teeth "2, 3, 4", a coil portion 26 straddling the teeth "8, 9, 10", and a coil portion 26 straddling the teeth "14, 15, 16" are formed by the other side of the double flyer as three coil portions connected together in series.

FIG. 5(1) illustrates a seventh set, in which a coil portion 26 straddling the teeth "6, 7, 8", a coil portion 26 straddling the teeth "12, 13, 14", and a coil portion 26 straddling the teeth "18, 1, 2" are formed by the one side of the double flyer as three coil portions connected together in series. A coil portion 26 straddling the teeth "15, 16, 17", a coil portion 26 straddling the teeth "3, 4, 5", and a coil portion 26 straddling the teeth "9, 10, 11" are formed by the other side of the double flyer as three coil portions connected together in series.

FIG. 5(2) illustrates an eighth set, in which a coil portion 26 straddling the teeth "1, 2, 3", a coil portion 26 straddling the teeth "7, 8, 9", and a coil portion 26 straddling the teeth "13, 14, 15" are formed by the one side of the double flyer as three coil portions connected together in series. A coil portion 26 straddling the teeth "10, 11, 12", a coil portion 26 straddling the teeth "16, 17, 18", and a coil portion 26 straddling the teeth "4, 5, 6" are formed by the other side of the double flyer as three coil portions connected together in series.

FIG. 5(3) illustrates a ninth set, in which a coil portion 26 straddling the teeth "14, 15, 16", a coil portion 26 straddling the teeth "2, 3, 4", and a coil portion 26 straddling the teeth "8, 9, 10" are formed by the one side of the double flyer as three coil portions connected together in series. A coil portion 26 straddling the teeth "5, 6, 7", a coil portion 26 straddling the teeth "11, 12, 13", and a coil portion 26 straddling the teeth "17, 18, 1" are formed by the other side of the double flyer as three coil portions connected together in series.

In the rotating armature manufactured as described above, the plural coil portions 26 that are each wound plural times straddling three of the teeth 22 are overlap wound, and partially overlap with their armature core 12 circumferential direction neighbors. The total number of the plural coil portions 26 is 3×2×9 sets=54 (see FIG. 5(3)).

As illustrated in FIG. 3 to FIG. 5, each of the plural coil portions 26 straddles the same number, namely three, of the teeth 22, and each of the plural windings 16 forming the plural coil portions 26 is formed with three of the coil portions 26 disposed at uniform intervals around the circumferential direction of the armature core 12. Moreover, as illustrated in FIG. 1, in each of the plural windings 16, the three coil portions 26 are connected together in series, and each of the windings 16 including three of the coil portions 26 is connected to one segment 24, and to another segment 24 out of the plural segments 24 that is in the same phase as the one segment 24.

As illustrated in FIG. 1, in each of the plural windings 16, coupling lines 28 that couple together the plural coil portions 26 are laid out (passed) in the opposite direction to the winding direction of the plural coil portions 26, and the coupling lines 28 are laid out over the shortest distance. Namely, the winding direction of the coil portions 26 is in the arrow P direction, and the direction for laying out the coupling lines 28 is the opposite direction to the arrow P direction.

The coil portions 26 formed from the first set to the third set illustrated in FIG. 3 configure a first layer, the coil portions 26 formed from the fourth set to the sixth set illustrated in FIG. 4 configure a second layer, and the coil portions 26 formed from the seventh set to the ninth set illustrated in FIG. 5 configure a third layer. Accordingly, the three respective teeth 22 (respective tooth groups) that each of the coil portions 26 are wound around are wound with coil portions 26 in plural layers (three layers in the present exemplary embodiment).

The plural coil portions 26 configuring each layer are configured by plural first coil portions 26 formed in first windings 16 (heavily shaded), and plural second coil portions 26 formed in second windings 16 (lightly shaded). The first coil portions 26 and the second coil portions 26 are disposed alternately around the circumferential direction of the armature core 12. One end portion of each of the first coil portions 26 (portions on the second coil portion 26 side end thereof) and the other end portions of each of the second coil portions 26 (portions on the first coil portion 26 side end thereof) are both inserted into the same slots as each other between the plural teeth 22.

The sum of the number of turns in the first layer, the number of turns in the second layer, and the number of turns in the third layer is the total number of turns of the three layers of coil portions 26 wound onto each three teeth (each tooth group). When each layer has the same number of turns, for example, 6+6+6, this corresponds to a conventional 18-turn rotating electric machine. There is no limitation to each layer having the same number of turns, and, for example, 6+6+5 would correspond to a 17-turn rotating electric machine. If the windings have the same wire diameter as in a conventional rotating electric machine, the rotating electric machine will have the same output characteristics thereto. In the present exemplary embodiment, the three coil portions of the same phase are disposed at uniform 120° intervals and connected together in series for one third of the total turns, with three layers of windings. The number of turns in the three layers is not limited to being one third of the total turns, as long as the total number (sum) of turns of the three layers of coil portions 26 wound onto each three teeth (each tooth group) are the same as each other.

Note that although the above is a case in which a double flyer is employed, a single flyer may be employed in the present exemplary embodiment.

FIG. 6 to FIG. 9 illustrate winding of 18 windings 16 in sequence using a single flyer. Namely, FIG. 6(1) illustrates a first set, in which a coil portion 26 straddling the teeth "18, 1, 2", a coil portion 26 straddling the teeth "6, 7, 8", and a coil portion 26 straddling the teeth "12, 13, 14" are formed as three coil portions connected together in series.

Figure 6:
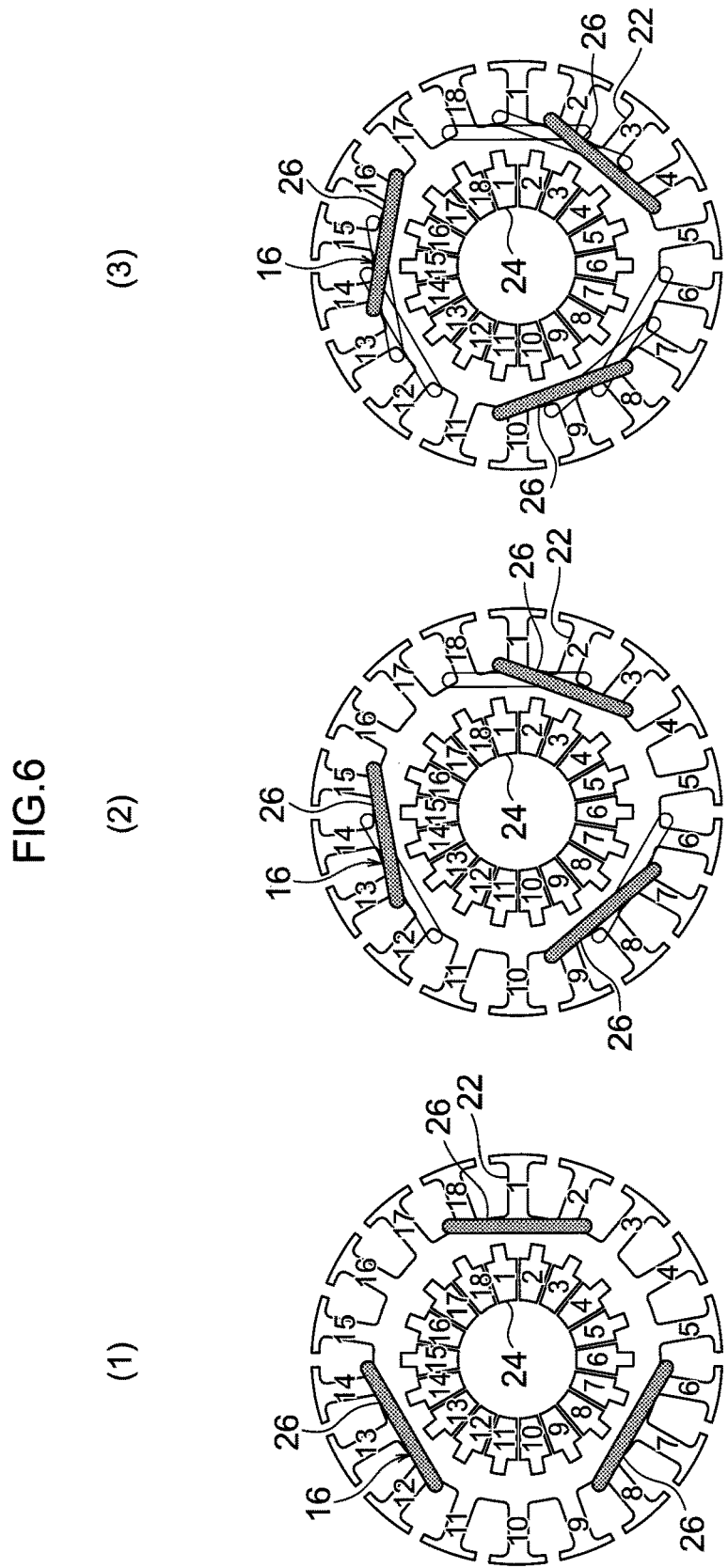
FIG. 6 is an explanatory diagram illustrating a manufacturing method (single winding) of a rotating armature of the present exemplary embodiment.

FIG. 6(2) illustrates a second set, in which a coil portion 26 straddling the teeth "13, 14, 15", a coil portion 26 straddling the teeth "1, 2, 3", and a coil portion 26 straddling the teeth "7, 8, 9" are formed as three coil portions connected together in series.

FIG. 6(3) illustrates a third set, in which a coil portion 26 straddling the teeth "8, 9, 10", a coil portion 26 straddling the teeth "14, 15, 16", and a coil portion 26 straddling the teeth "2, 3, 4" are formed as three coil portions connected together in series.

FIG. 7(1) illustrates a fourth set, in which a coil portion 26 straddling the teeth "3, 4, 5", a coil portion 26 straddling the teeth "9, 10, 11", and a coil portion 26 straddling the teeth "15, 16, 17" are formed as three coil portions connected together in series.

FIG. 7(2) illustrates a fifth set, in which a coil portion 26 straddling the teeth "16, 17, 18", a coil portion 26 straddling the teeth "4, 5, 6", and a coil portion 26 straddling the teeth "10, 11, 12" are formed as three coil portions connected together in series.

FIG. 7(3) illustrates a sixth set, in which a coil portion 26 straddling the teeth "11, 12, 13", a coil portion 26 straddling the teeth "17, 18, 1", and a coil portion 26 straddling the teeth "5, 6, 7" are formed as three coil portions connected together in series.

Figure 8:
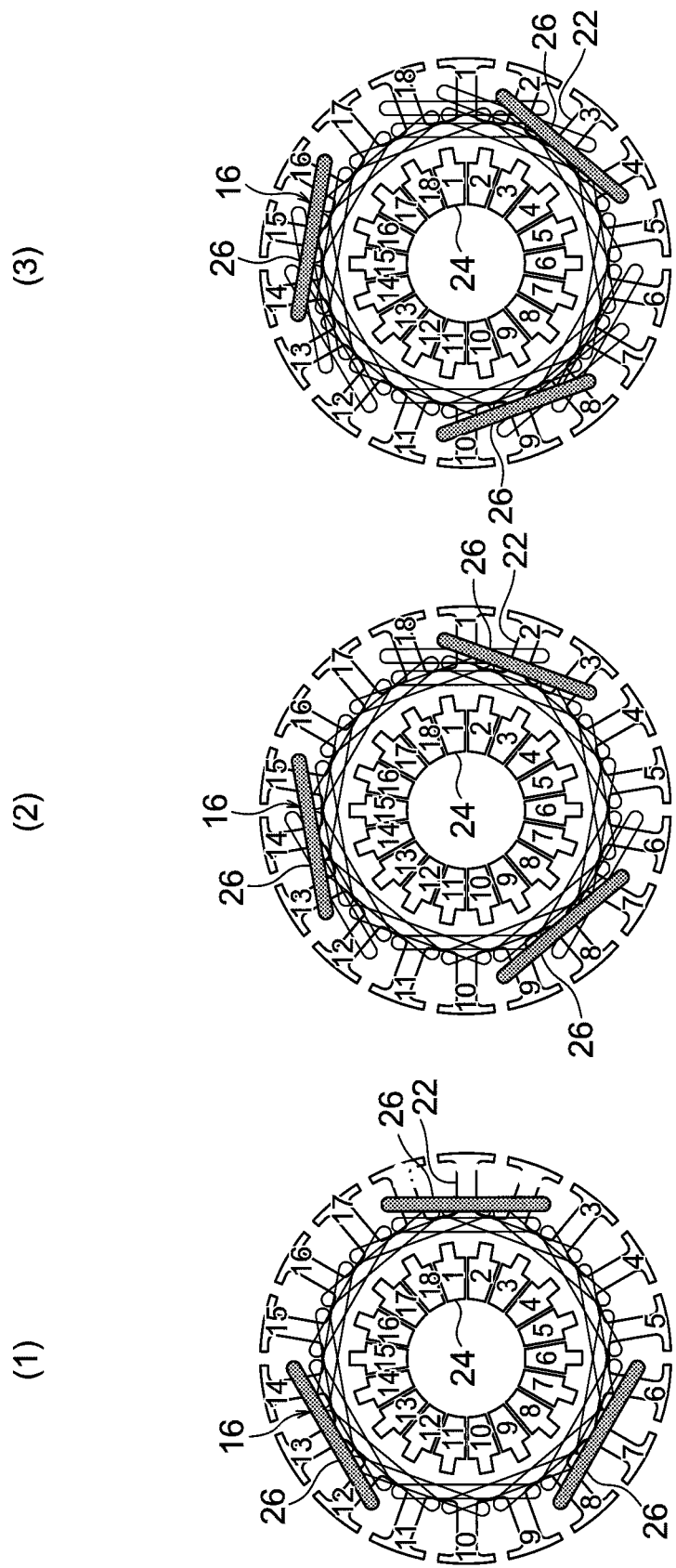
FIG. 8 is an explanatory diagram illustrating a manufacturing method (single winding) of a rotating armature of the present exemplary embodiment.

FIG. 8(1) illustrates a seventh set, in which a coil portion 26 straddling the teeth "6, 7, 8", a coil portion 26 straddling the teeth "12, 13, 14", and a coil portion 26 straddling the teeth "18, 1, 2" are formed as three coil portions connected together in series.

FIG. 8(2) illustrates an eighth set, in which a coil portion 26 straddling the teeth "1, 2, 3", a coil portion 26 straddling the teeth "7, 8, 9", and a coil portion 26 straddling the teeth "13, 14, 15" are formed as three coil portions connected together in series.

FIG. 8(3) illustrates a ninth set, in which a coil portion 26 straddling the teeth "14, 15, 16", a coil portion 26 straddling the teeth "2, 3, 4", and a coil portion 26 straddling the teeth "8, 9, 10" are formed as three coil portions connected together in series.

Figure 9:
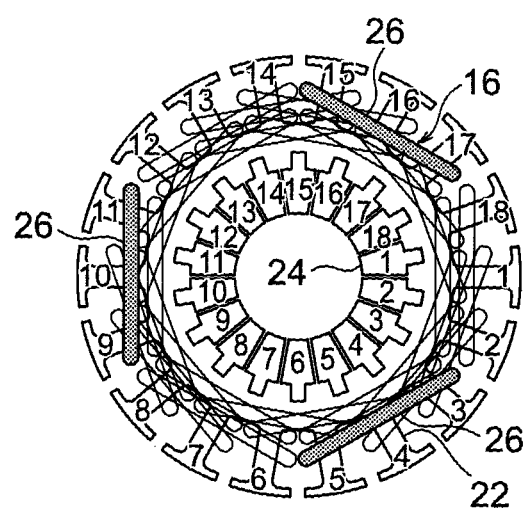
FIG. 9 is an explanatory diagram illustrating a manufacturing method (single winding) of a rotating armature of the present exemplary embodiment.

FIG. 9 illustrates a tenth set, in which a coil portion 26 straddling the teeth "9, 10, 11", a coil portion 26 straddling the teeth "15, 16, 17", and a coil portion 26 straddling the teeth "3, 4, 5" are formed as three coil portions connected together in series.

Although the subsequent process is not illustrated in the drawings, in an eleventh set, a coil portion 26 straddling the teeth "4, 5, 6", a coil portion 26 straddling the teeth "10, 11, 12", and a coil portion 26 straddling the teeth "16, 17, 18" are formed as three coil portions connected together in series.

In a twelfth set, a coil portion 26 straddling the teeth "17, 18, 1", a coil portion 26 straddling the teeth "5, 6, 7", and a coil portion 26 straddling the teeth "11, 12, 13" are formed as three coil portions connected together in series.

In a thirteenth set, a coil portion 26 straddling the teeth "12, 13, 14", a coil portion 26 straddling the teeth "18, 1, 2", and a coil portion 26 straddling the teeth "6, 7, 8" are formed as three coil portions connected together in series.

In a fourteenth set, a coil portion 26 straddling the teeth "7, 8, 9", a coil portion 26 straddling the teeth "13, 14, 15", and a coil portion 26 straddling the teeth "1, 2, 3" are formed as three coil portions connected together in series.

In a fifteenth set, a coil portion 26 straddling the teeth "2, 3, 4", a coil portion 26 straddling the teeth "8, 9, 10", and a coil portion 26 straddling the teeth "14, 15, 16" are formed as three coil portions connected together in series.

In a sixteenth set, a coil portion 26 straddling the teeth "15, 16, 17", a coil portion 26 straddling the teeth "3, 4, 5", and a coil portion 26 straddling the teeth "9, 10, 11" are formed as three coil portions connected together in series.

In a seventeenth set, a coil portion 26 straddling the teeth "10, 11, 12", a coil portion 26 straddling the teeth "16, 17, 18", and a coil portion 26 straddling the teeth "4, 5, 6" are formed as three coil portions connected together in series.

In an eighteenth set, a coil portion 26 straddling the teeth "5, 6, 7", a coil portion 26 straddling the teeth "11, 12, 13", and a coil portion 26 straddling the teeth "17, 18, 1" are formed as three coil portions connected together in series.

In cases in which a single flyer is employed in this manner, similarly to in cases in which a double flyer is employed, a rotating armature is manufactured in which three coil portions 26 that are in the same phase as each other are connected together in series in each of the windings 16.

Next, explanation follows regarding operation and advantageous effects of the present exemplary embodiment.

First, in order to clarify the operation and advantageous effects of the present exemplary embodiment, explanation is given regarding a first and a second comparative example.

First Comparative Example

Figure 26:
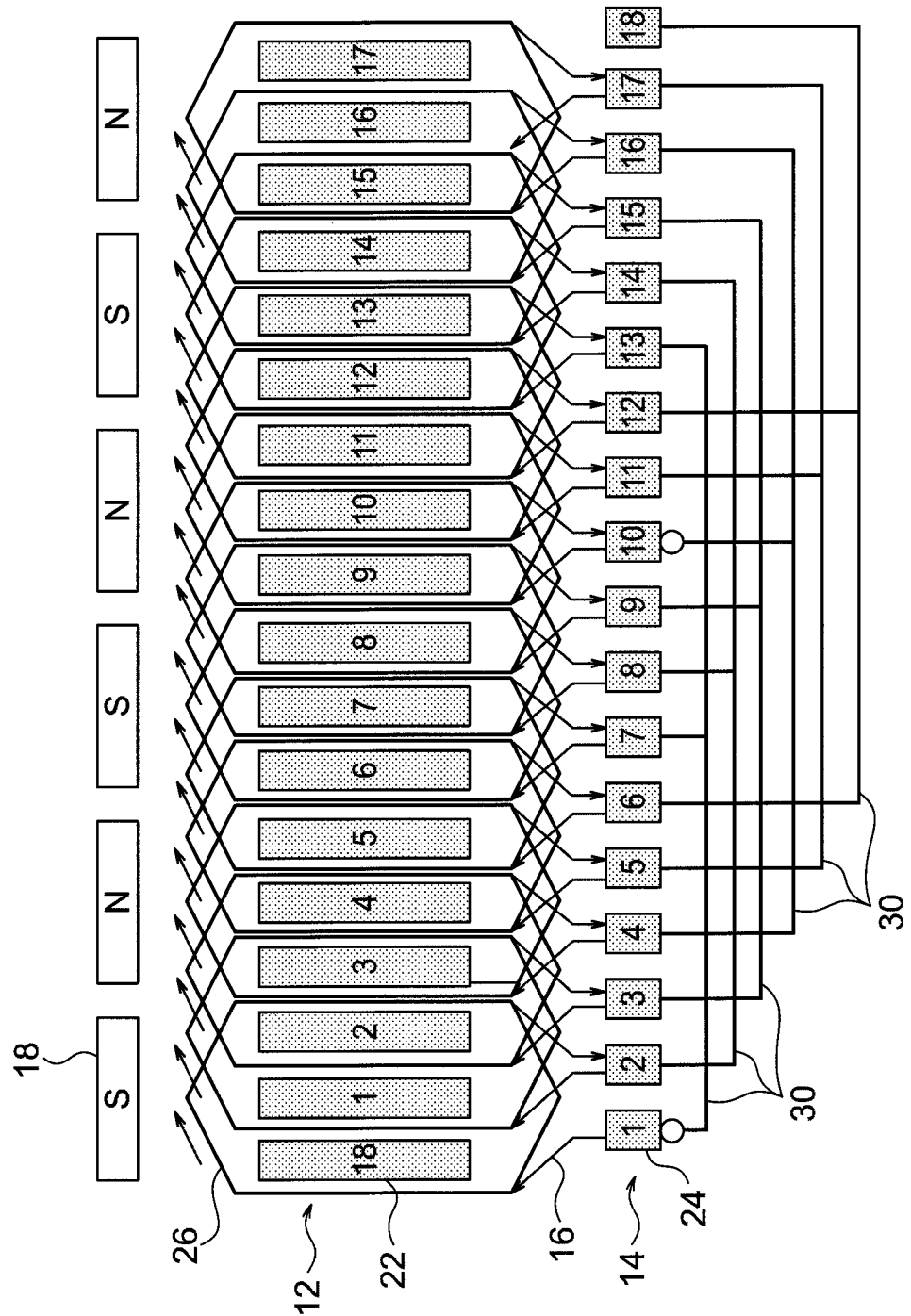
FIG. 26 is a configuration diagram illustrating a rotating electric machine of a first comparative example.
Figure 27:
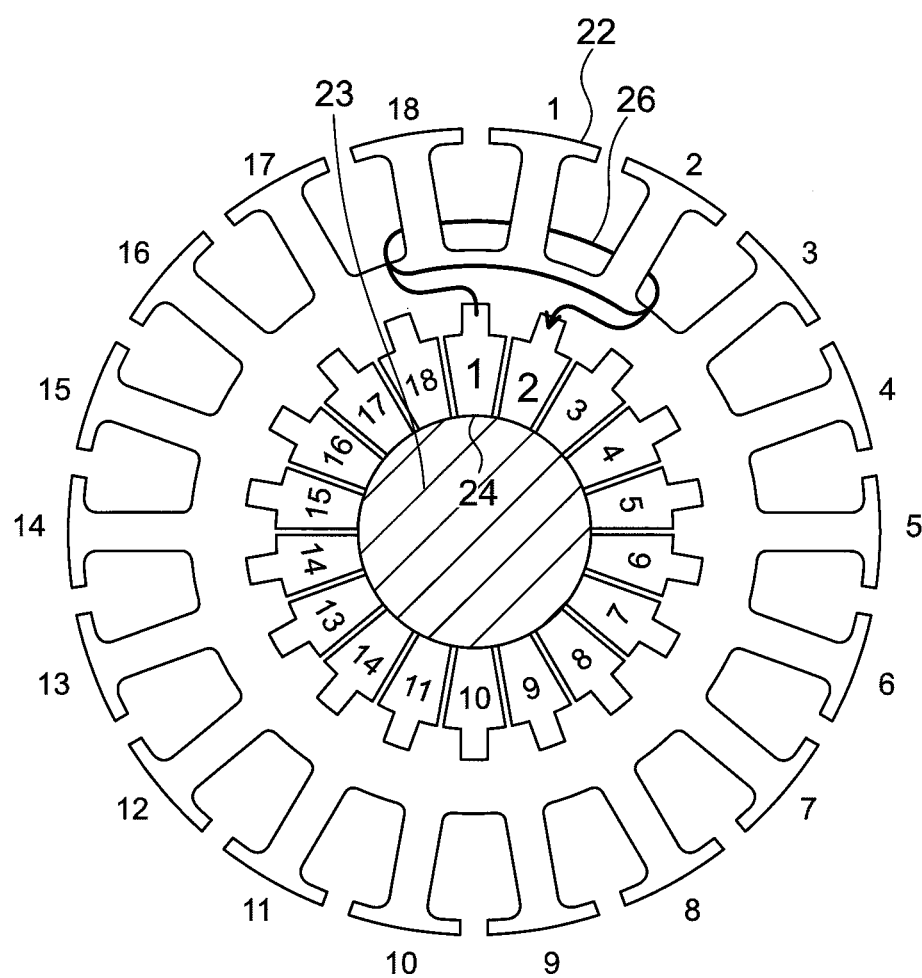
FIG. 27 is a drawing viewed along an axial direction of a rotating armature of the first comparative example.

The first comparative example illustrated in FIG. 26 and FIG. 27 employs a method in which voltage equalizer lines 30 short between 3 segments 24 that are at the same potential. FIG. 26 is a diagram illustrating a case in which a double flyer is employed. Moreover, FIG. 26 is a diagram in which the double flyer starts winding the windings 16 from the segment "1" on the one side, and at the same time the double flyer starts winding the windings 16 from the segment "10" (a facing position at 180°) on the other side.

The windings 16 have the same wire diameter and the same number of turns as in the present exemplary embodiment described above, and the voltage equalizer lines 30 are added between the segments 24 prior to forming the windings 16. The voltage equalizer lines 30 are formed (for example, joining the segments "1"→"7"→"13") by separate processing prior to forming the coil portions 26 (main windings). FIG. 27 illustrates a state in which the first winding 16 has been wound. Each winding 16 is wound straddling three of the teeth 22.

Figure 28:
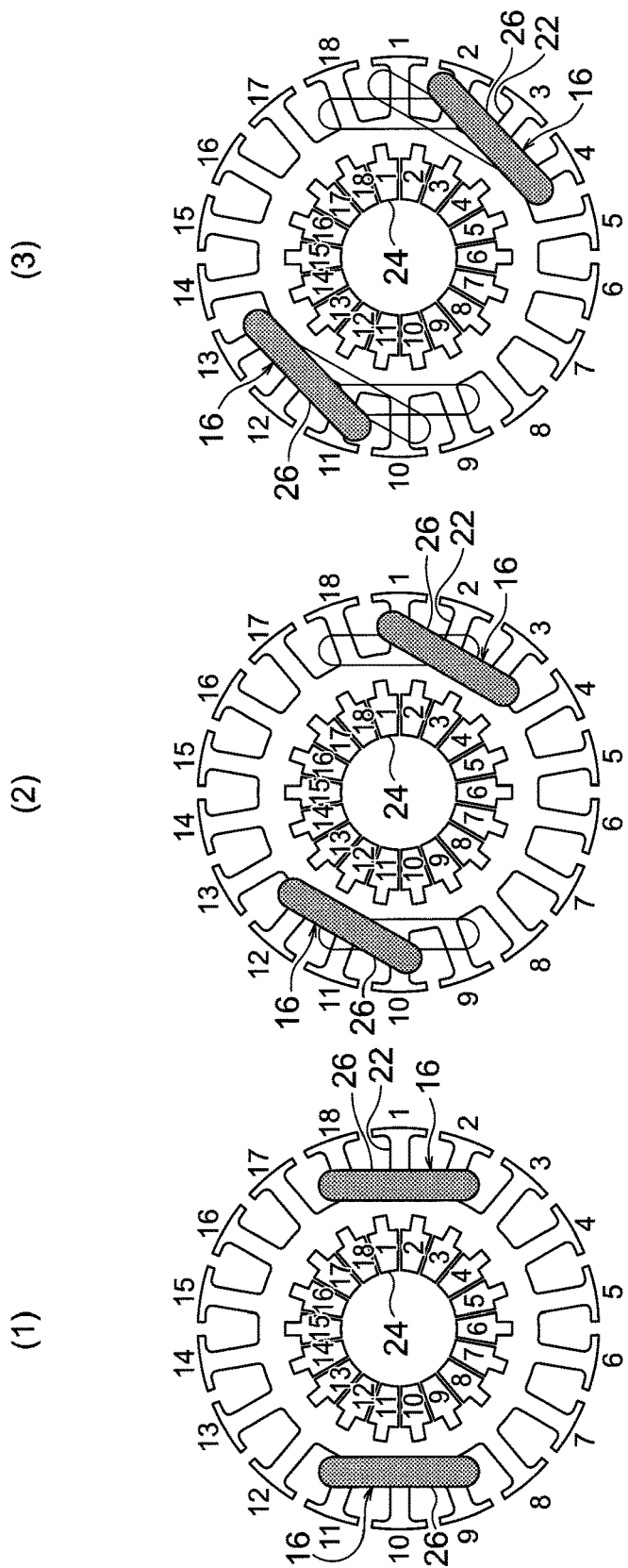
FIG. 28 is an explanatory diagram illustrating a manufacturing method (double winding) of a rotating armature of the first comparative example.
Figure 29:
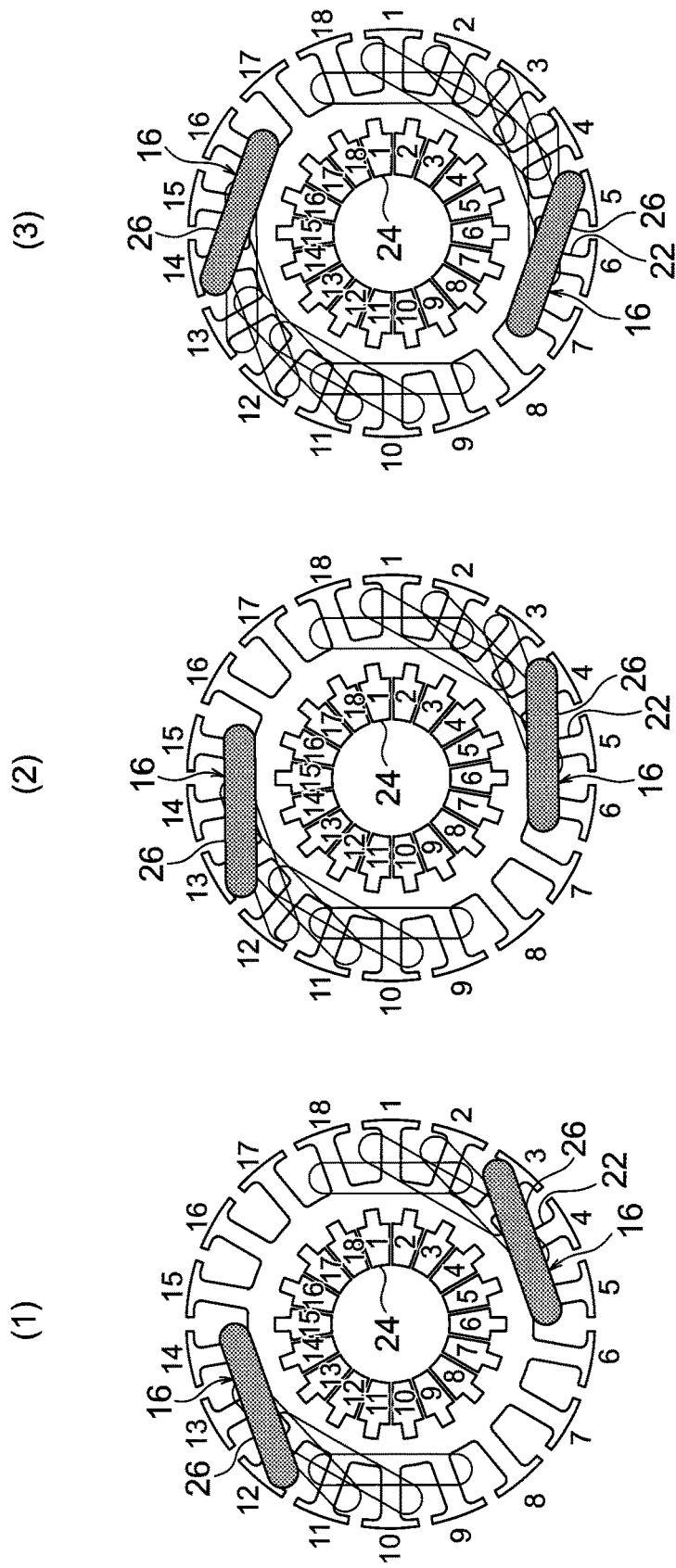
FIG. 29 is an explanatory diagram illustrating a manufacturing method (double winding) of a rotating armature of the first comparative example.
Figure 30:
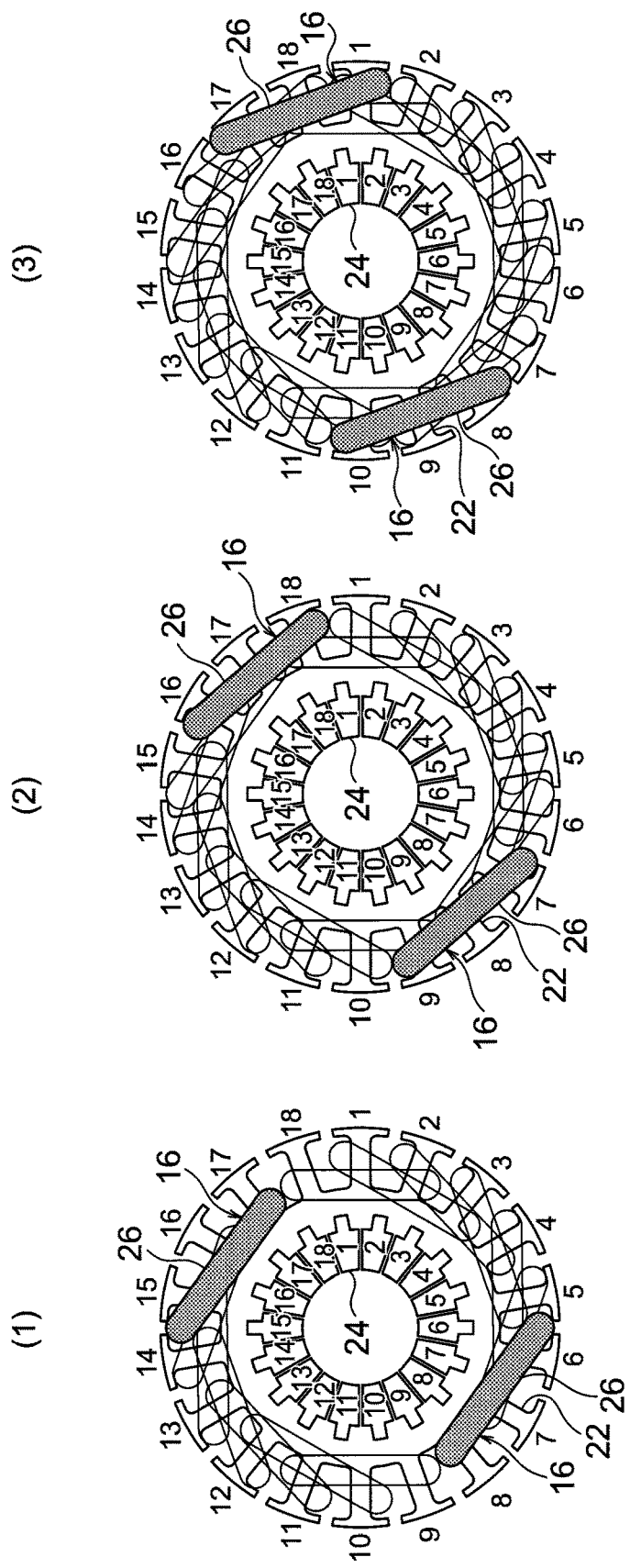
FIG. 30 is an explanatory diagram illustrating a manufacturing method (double winding) of a rotating armature of the first comparative example.

FIG. 28 to FIG. 30 illustrate winding of 18 windings in sequence using a double flyer. Namely, FIG. 28(1) illustrates a first set, in which a coil portion 26 straddling the teeth "18, 1, 2" is formed by the one side of the double flyer. A coil portion 26 straddling the teeth "9, 10, 11" is formed by the other side of the double flyer.

FIG. 28(2) illustrates a second set, in which a coil portion 26 straddling the teeth "1, 2, 3" is formed by the one side of the double flyer. A coil portion 26 straddling the teeth "10, 11, 12" is formed by the other side of the double flyer.

FIG. 28(3) illustrates a third set, in which a coil portion 26 straddling the teeth "2, 3, 4" is formed by the one side of the double flyer. A coil portion 26 straddling the teeth "11, 12, 13" is formed by the other side of the double flyer.

FIG. 29(1) illustrates a fourth set, in which a coil portion 26 straddling the teeth "3, 4, 5" is formed by the one side of the double flyer. A coil portion 26 straddling the teeth "12, 13, 14" is formed by the other side of the double flyer.

FIG. 29(2) illustrates a fifth set, in which a coil portion 26 straddling the teeth "4, 5, 6" is formed by the one side of the double flyer. A coil portion 26 straddling the teeth "13, 14, 15" is formed by the other side of the double flyer.

FIG. 29(3) illustrates a sixth set, in which a coil portion 26 straddling the teeth "5, 6, 7" is formed by the one side of the double flyer. A coil portion 26 straddling the teeth "14, 15, 16" is formed by the other side of the double flyer.

FIG. 30(1) illustrates a seventh set, in which a coil portion 26 straddling the teeth "6, 7, 8" is formed by the one side of the double flyer. A coil portion 26 straddling the teeth "15, 16, 17" is formed by the other side of the double flyer.

FIG. 30(2) illustrates an eighth set, in which a coil portion 26 straddling the teeth "7, 8, 9" is formed by the one side of the double flyer. A coil portion 26 straddling the teeth "16, 17, 18" is formed by the other side of the double flyer.

FIG. 30(3) illustrates a ninth set, in which a coil portion 26 straddling the teeth "8, 9, 10" is formed by the one side of the double flyer. A coil portion 26 straddling the teeth "17, 18, 1" is formed by the other side of the double flyer.

Figure 31:
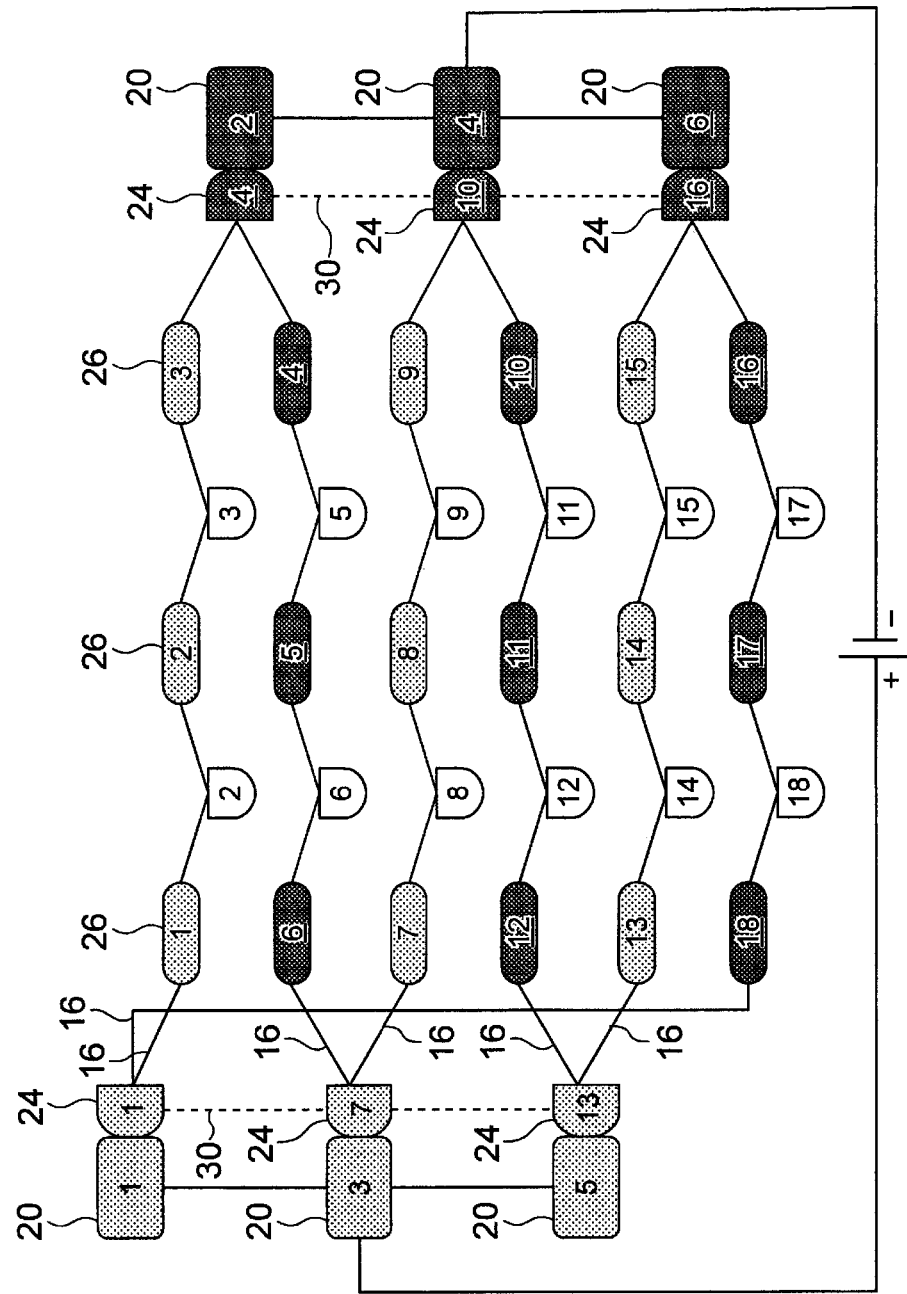
FIG. 31 is an explanatory diagram illustrating operation of a rotating armature of the first comparative example.
Figure 32:
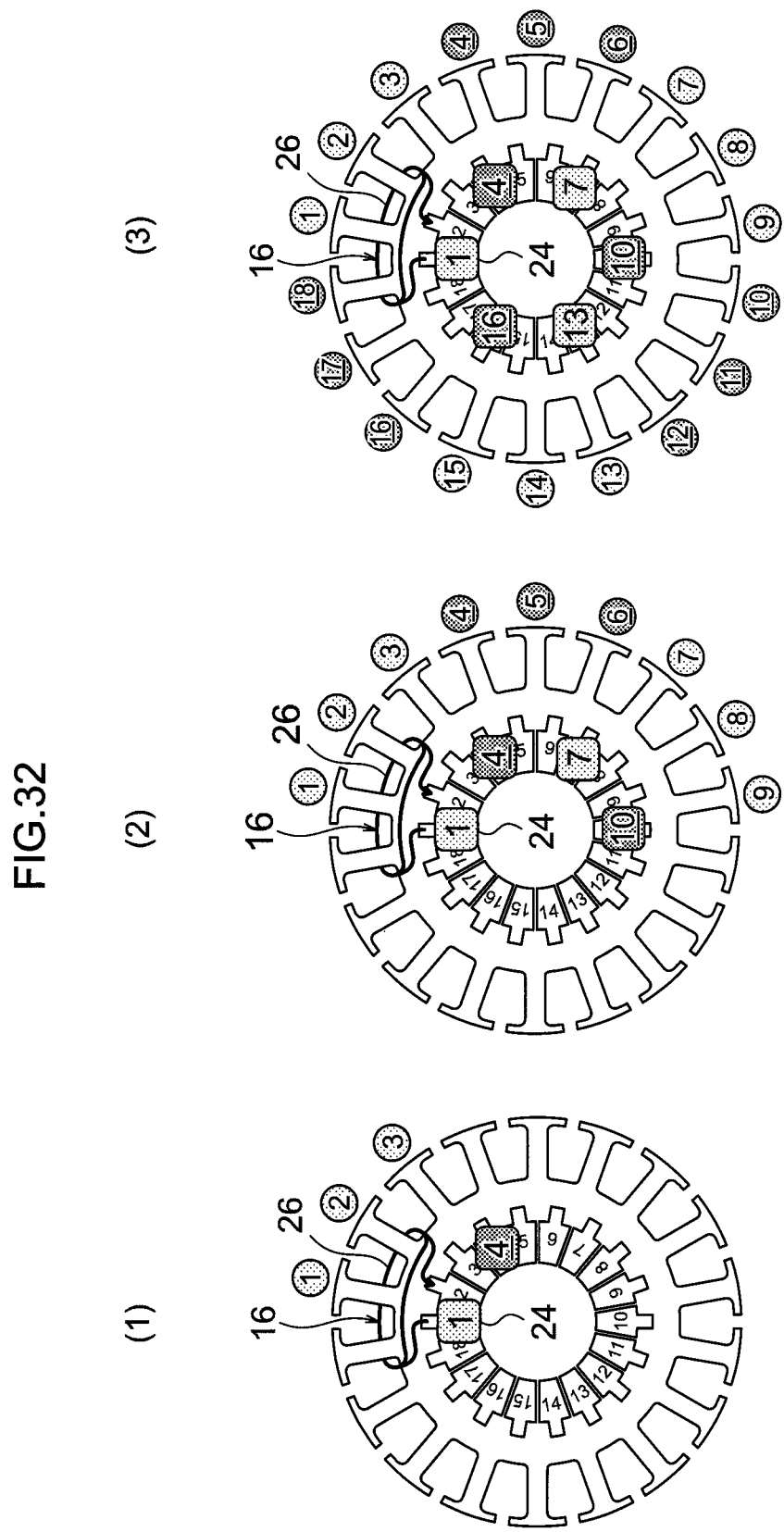
FIG. 32 is an explanatory diagram illustrating operation of a rotating armature of the first comparative example.

However, the following issues exist in the first comparative example. FIG. 31 illustrates a wiring connection diagram of the brushes 20, the segments 24, the coil portions 26 and the voltage equalizer lines 30 of the first comparative example. FIG. 32 illustrate excitation states when current is passed through the coil portions 26 in the first comparative example.

In FIG. 31 and FIG. 32, the plural coil portions 26 are each labeled with the numbers 1 to 18. The plural coil portions 26 whose numbers are underlined indicate those in which currents flow in opposite directions (reversely excited coil portions). Furthermore, the plural segments 24 whose numbers are underlined indicate those that are in contact with the negatively poled brushes 20.

As illustrated in FIG. 31, in the first comparative example, the voltage equalizer lines 30 are formed to some of the windings 16 between segments 24 of the same phase in order to suppress an imbalance from arising in the magnetic fields in the plural coil portions 26. Alternatively, sometimes voltage equalizer members are employed in place of the voltage equalizer lines 30. However, when employing such voltage equalizer lines, voltage equalizer members, or the like, there are concerns regarding this leading to an increase in the number of components, and therefore an increase in cost, and to an increase in structural size and complexity.

As illustrated in FIG. 32, in the first comparative example, an asymmetric excitation state exists until current is switched at the segment the sixth brush brushes against. Namely, in the first comparative example, as illustrated in FIG. 32(1), first, the current between segment "1" (+) and segment "4" (−) is switched, after which, although not illustrated in the drawings, the current between segment "4" (−) and segment "7" (+) is switched.

Then, as illustrated in FIG. 32(2), the current between segment "7" (+) and segment "10" (−) is switched, after which, although not illustrated in the drawings, next the current between segment "10" (−) and segment "13" (+) is switched. Lastly, as illustrated in FIG. 32(3), the current between segment "13" (+) and segment "16" (−) is switched.

Accordingly, in the first comparative example, an asymmetric excitation state exists until the current at the segment the sixth brush brushes against is switched. An imbalance therefore arises in the magnetic field of the plural coil portions 26. This imbalance in the magnetic fields is a cause of vibration and noise during rotation of the rotating armature. There is moreover a concern of shortening the brush lifespan due to excessive current occurring at the brush where switching first occurs.

In cases in which the voltage equalizer lines 30 are employed, the number of wires entwined in the anchor claws of the segments increases, necessitating an increase in size of the spacing between segments, and therefore the external diameter of the commutator. The difficulty of fusing accordingly increases, and the commutator increases in size. Dedicated winding equipment is required to separately apply the voltage equalizer lines 30 to the coil portions 26, these being the main windings, increasing costs. Moreover, terminals of the voltage equalizer lines 30 are in an unstable state until the main windings are completed, and there is accordingly a concern of defects arising, such as the wires at the terminals of the voltage equalizer lines 30 being pulled out.

Second Comparative Example

Figure 33:
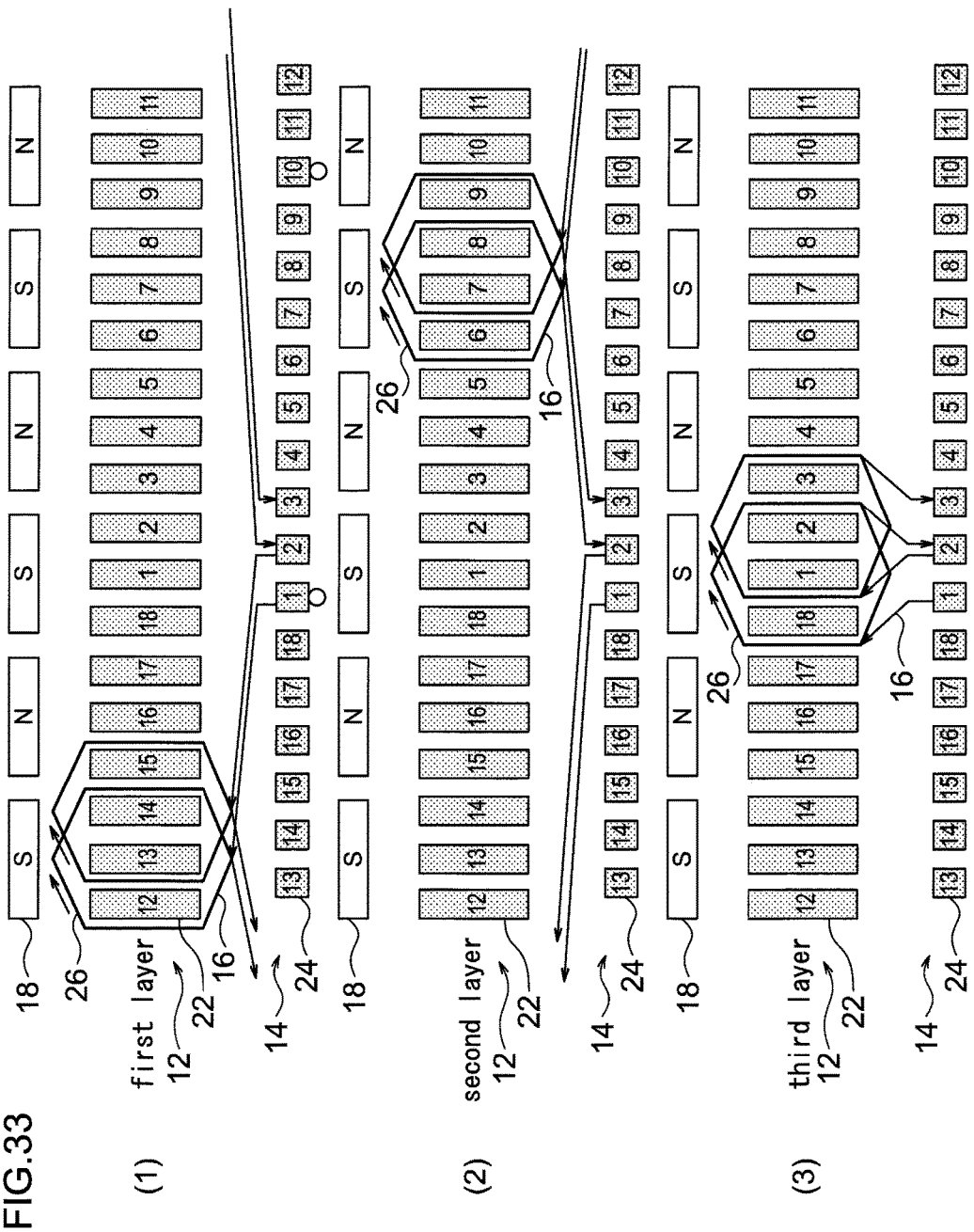
FIG. 33 is a configuration diagram illustrating a rotating electric machine of a second comparative example.
Figure 34:
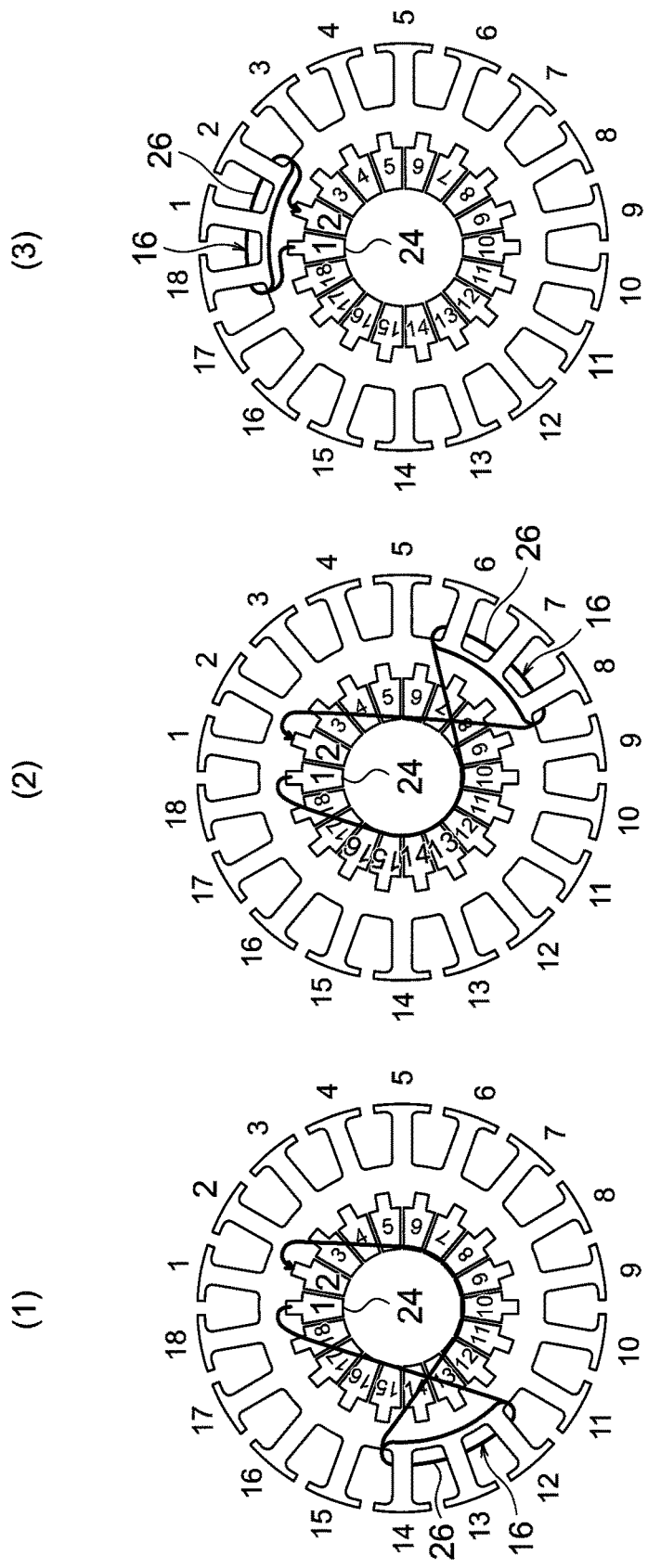
FIG. 34 is a drawing illustrating a manufacturing method of a rotating armature of the second comparative example.

A second comparative example, illustrated in FIG. 33 and FIG. 34, employs a method in which three coil portions 26 are connected to same potential segments 24 out of the segments 24, the respective windings 16 are formed by thin wire, and the coil portions 26 are cross wound in three independent layers. FIG. 33 is a diagram illustrating one side in a case in which a double flyer is employed. In FIG. 33 the double flyer starts winding the windings 16 from the segment "1" on the one side, and at the same time the double flyer starts winding the windings 16 from the segment "10" on the other side (a facing position at 180°). The windings 16 of the second comparative example have a wire diameter such that the cross-section area is one third that of the windings 16 of the present exemplary embodiment, and have the same number of turns as in the first comparative example.

FIG. 34 illustrate winding of the windings 16 from a first layer to a third layer, and, in particular, only illustrate the windings 16 of the first coil in each layer. Namely, FIG. 34(1) illustrates a first coil of the first layer, in which a coil portion 26 is formed from the segment "1", straddles the teeth "12, 13, 14", and is connected to the segment "2". Then a coil portion 26 is formed from the segment "2", straddles the teeth "13, 14, 15", and is connected to the segment "3". Together with the other flyer, this process is performed nine times by each flyer so as to repeatedly wind a total of eighteen coils to complete the first layer. FIG. 34(2) illustrates the first coil of the second layer, in which a coil portion 26 is formed from the segment "1", straddles the teeth "6, 7, 8", and is connected to the segment "2". Similarly to in the first layer, a total of eighteen coils are wound repeatedly to complete the second layer. FIG. 34(3) illustrates the first coil of the third layer, in which a coil portion 26 is formed from the segment "1", straddles the teeth "18, 1, 2", and is connected to the segment "2". Similarly to in the first layer, a total of eighteen coils are wound repeatedly to complete the third layer.

However, the following issues exist in the second comparative example. Namely, since the total number of turns and the number of connection wires is three times higher, the winding process takes a long time, increasing costs. Moreover, there is an increase in the number of wires entwined in the anchor claws of the segments. In the first and second layers, crossing wires between the coil portions 26 and the terminals of the windings 16 have long wire lengths and are wound at the lower neck of the commutator, thereby increasing the distance between the commutator and the armature core and, as a result, increasing the size of the rotating armature, and therefore the rotating electric machine.

Present Exemplary Embodiment

In contrast thereto, the present exemplary embodiment enables the following beneficial operation and advantageous effects over the first and second comparative examples described above.

Namely, as illustrated in FIG. 1, in the present exemplary embodiment, the plural coil portions 26 (three in the present exemplary embodiment) are connected together in series in each of the plural windings 16, and the respective windings 16 including these plural coil portions 26 are connected to one segment 24 out of the plural segments 24, and another segment 24 out of the plural segments 24 that is in the same phase as the one segment 24. The plural coil portions 26 connected together in series in each of the windings 16 are disposed at uniform intervals around the circumferential direction of the armature core 12. The plural serially connected coil portions 26 of the same phase segments 24 are accordingly distributed uniformly around the circumferential direction of the armature core 12, thereby enabling an imbalance in the magnetic fields to be suppressed from arising even when there is misalignment in commutation timing, similarly to when voltage equalizer lines or voltage equalizer members are employed.

Next, explanation follows regarding operation of the rotating armature according to the present exemplary embodiment using FIG. 10A to FIG. 25B. FIG. 10A to FIG. 25B illustrate contact states between the brushes 20 and the segments 24, and excitation states when current is passed through the coil portions 26.

In FIG. 10A to FIG. 25B, the plural segments 24 and the plural coil portions 26 are each labeled with numbers 1 through 18, and the plural brushes 20 are labeled with numbers 1 through 6. The brushes 20 labeled with numbers 1, 3 and 5 are positively poled brushes and the brushes 20 labeled with numbers 2, 4 and 6 are negatively poled brushes. The plural segments 24 whose numbers are underlined illustrate those that are in contact with the negatively poled brushes 20. The plural coil portions 26 whose numbers are underlined illustrate those in which currents flow in opposite directions (reversely excited coil portions).

Below, the numbers 1 to 6 indicated in the drawings are used to identify individual pieces of the plural brushes 20. Similarly, the numbers 1 to 18 indicated in the drawings are used to identify individual pieces of the plural segments 24 and the plural coil portions 26. The plural coil portions 26 are layered in three layers in order from the inner side of the radial direction to the outer side of the radial direction on the teeth of the rotating armature.

(Phase: 0 Degree)

Figure 10A:
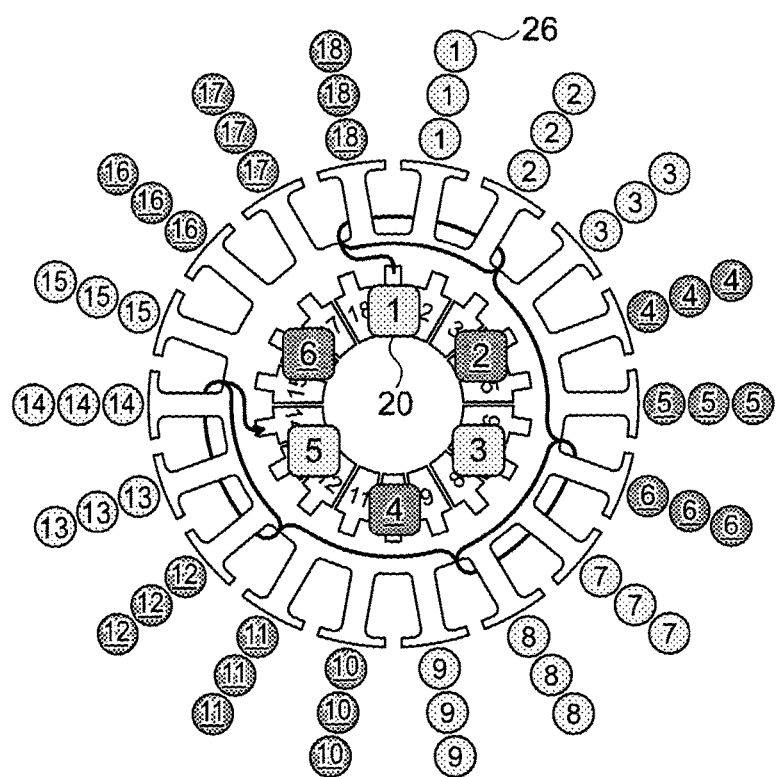
FIG. 10A is an explanatory diagram illustrating operation of a rotating armature of the present exemplary embodiment.
Figure 10B:
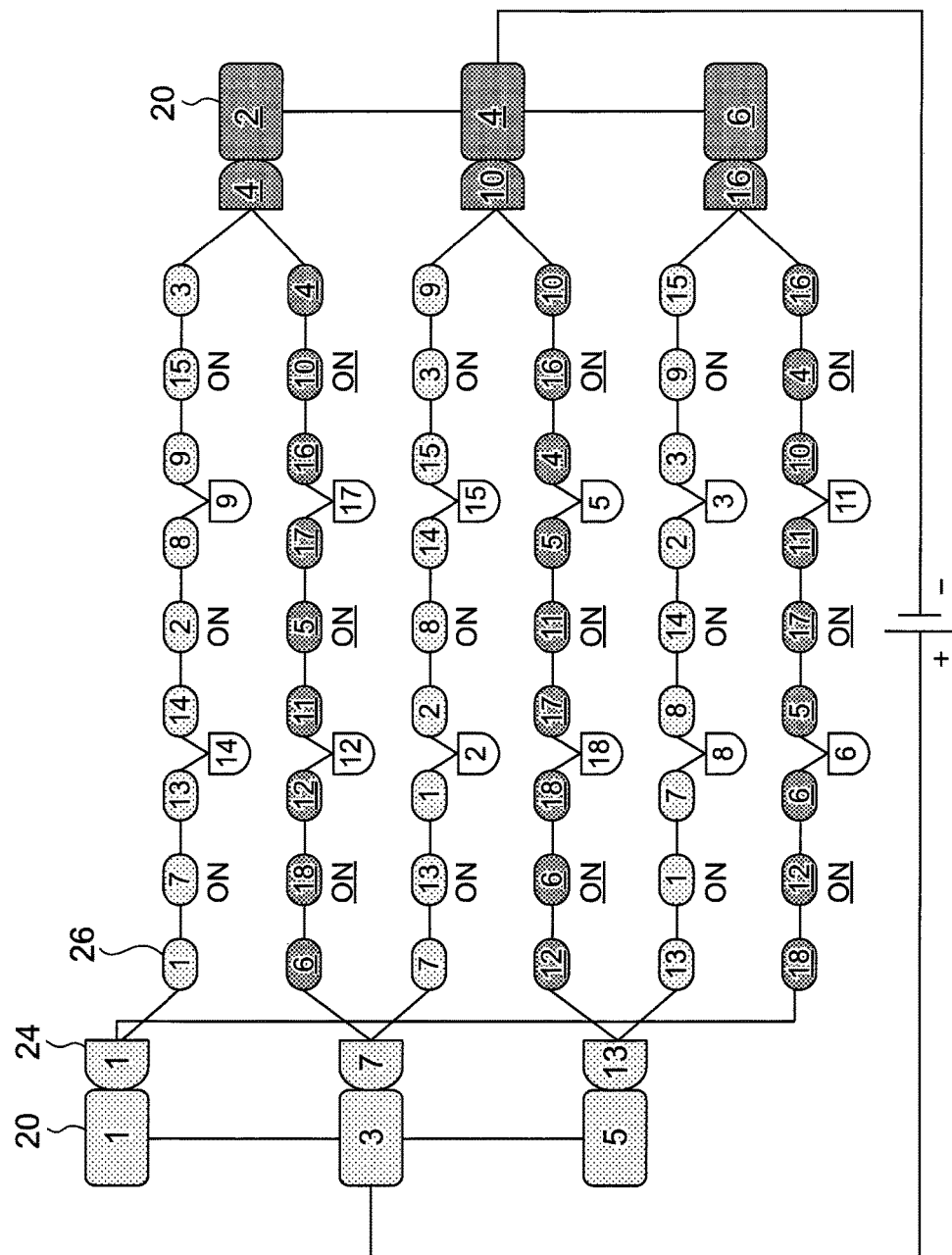
FIG. 10B is an explanatory diagram illustrating operation of a rotating armature of the present exemplary embodiment.

At a stage shown in FIG. 10A and FIG. 10B, the six brushes 1 to 6 are respectively in contact with each of pairs of segments that are facing each other out of eighteen segments 1 to 18. Moreover, the positively poled brush 1 is in contact with the segment 1, the positively poled brush 3 is in contact with the segment 7, and the positively poled brush 5 is in contact with the segment 13.

Furthermore, the negatively poled brush 2 is in contact with the segment 4, the negatively poled brush 4 is in contact with the segment 10 and the negatively poled brush 6 is in contact with the segment 16.

In such a state, the fifty-four coil portions 26 (1 to 18 times 3 layers=54) connected to each of the segments 24 are excited in a manner so as to have good rotational balance. Even if there are gaps in the switching timings of the six brushes, excitation balance is not lost. The state of shifting to the next segment 24 is illustrated below.

(Phase: 0 Degree to 20 Degrees) [Step 1]

Figure 11A:
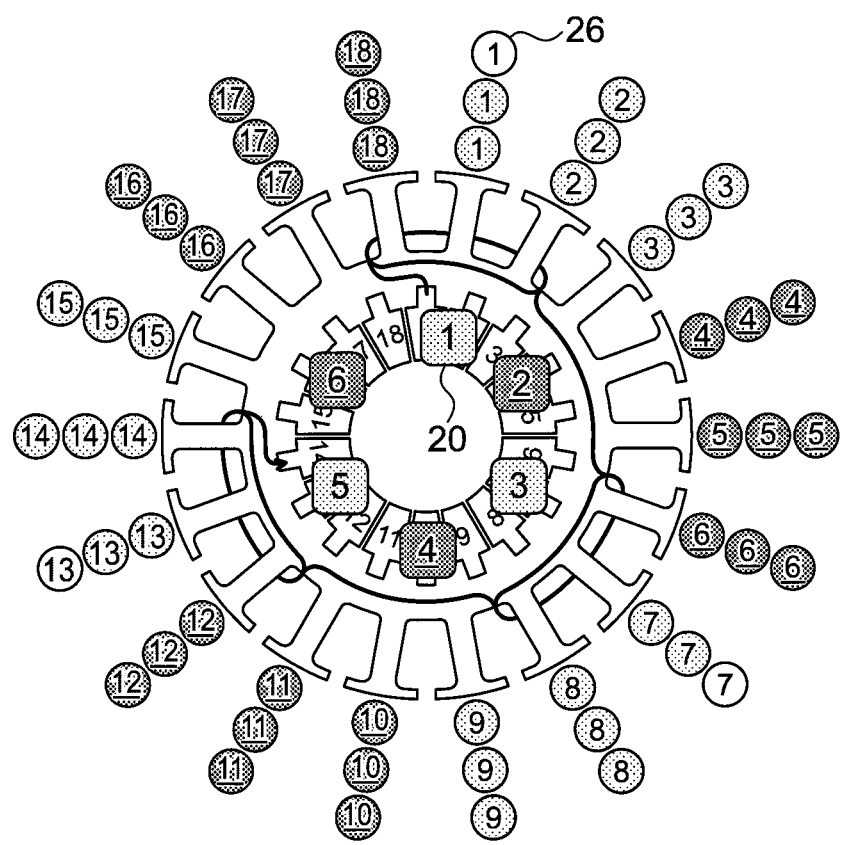
FIG. 11A is an explanatory diagram illustrating operation of a rotating armature of the present exemplary embodiment.
Figure 11B:
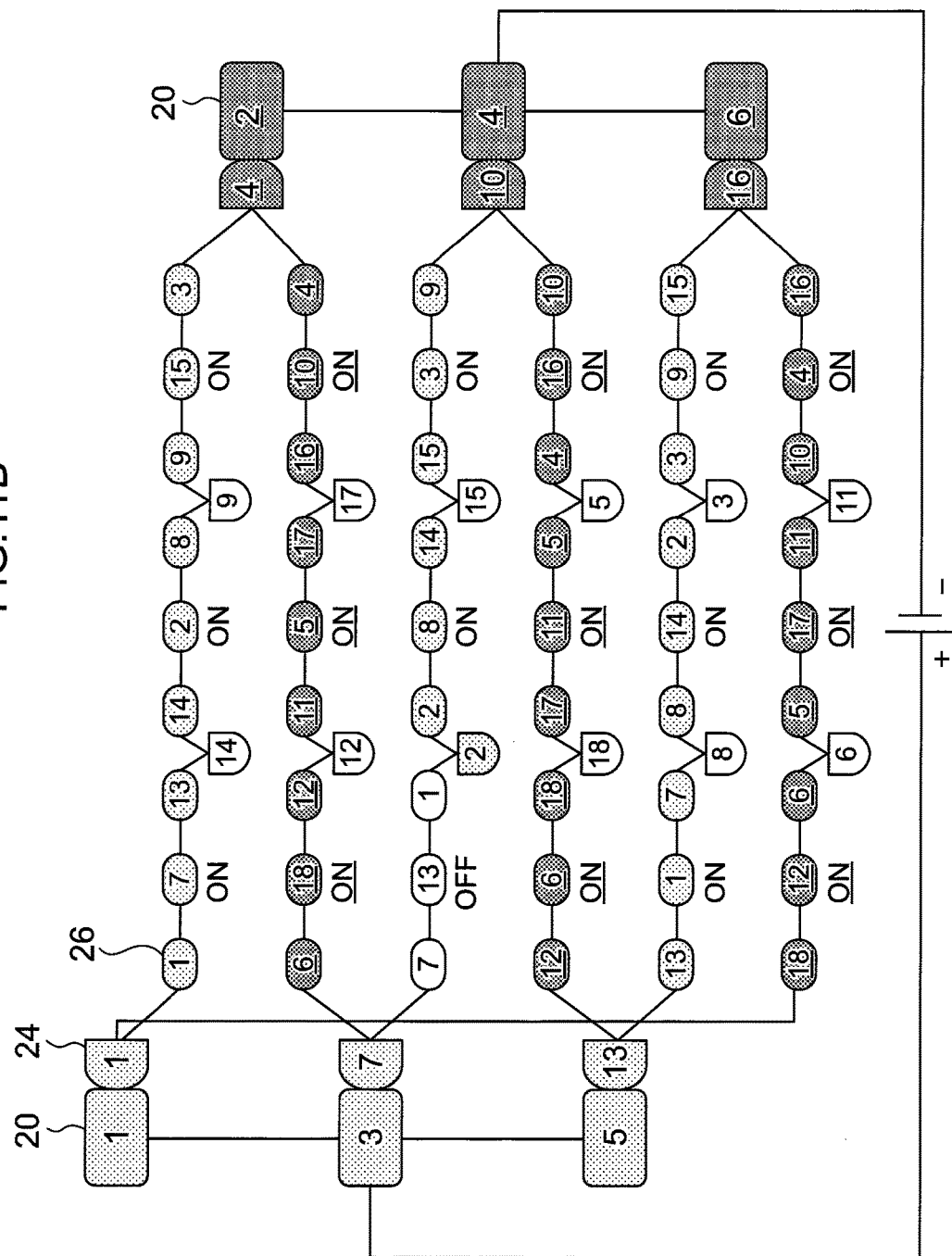
FIG. 11B is an explanatory diagram illustrating operation of a rotating armature of the present exemplary embodiment.

As the rotating armature 10 rotates, at a stage shown in FIG. 11A and FIG. 11B, the brush 1 straddles the segment 1 and the segment 2. In such a state, the segment 2 is positively poled, and the coil portions 1, 7 and 13 at the third layer are sandwiched between the same poled segments 24 and switched off. However, excitation balance is maintained.

(Phase: 0 Degree to 20 Degrees) [Step 2]

Figure 12A:
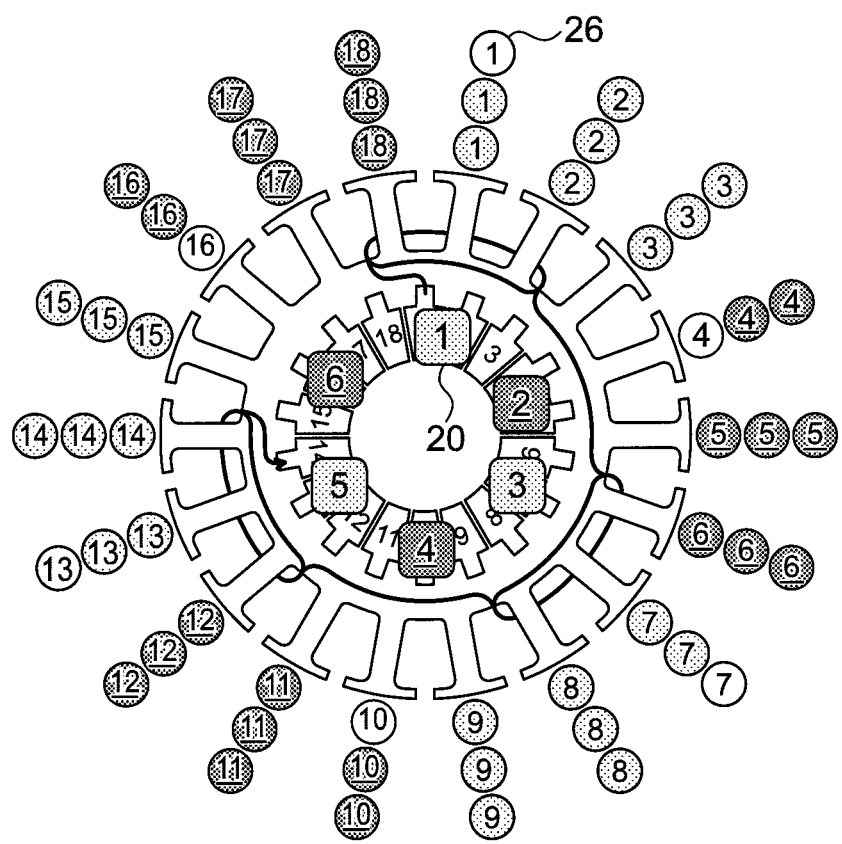
FIG. 12A is an explanatory diagram illustrating operation of a rotating armature of the present exemplary embodiment.

As the rotating armature 10 rotates, at a stage shown in FIG. 12A and FIG. 12B, the brush 2 straddles the segment 4 and the segment 5. In such a state, the segment 5 is negatively poled, and the coil portions 4, 10 and 16 at the first layer are sandwiched between the same poled segments 24 and switched off. However, excitation balance is maintained.

(Phase: 0 Degree to 20 Degrees) [Step 3]

Figure 13A:
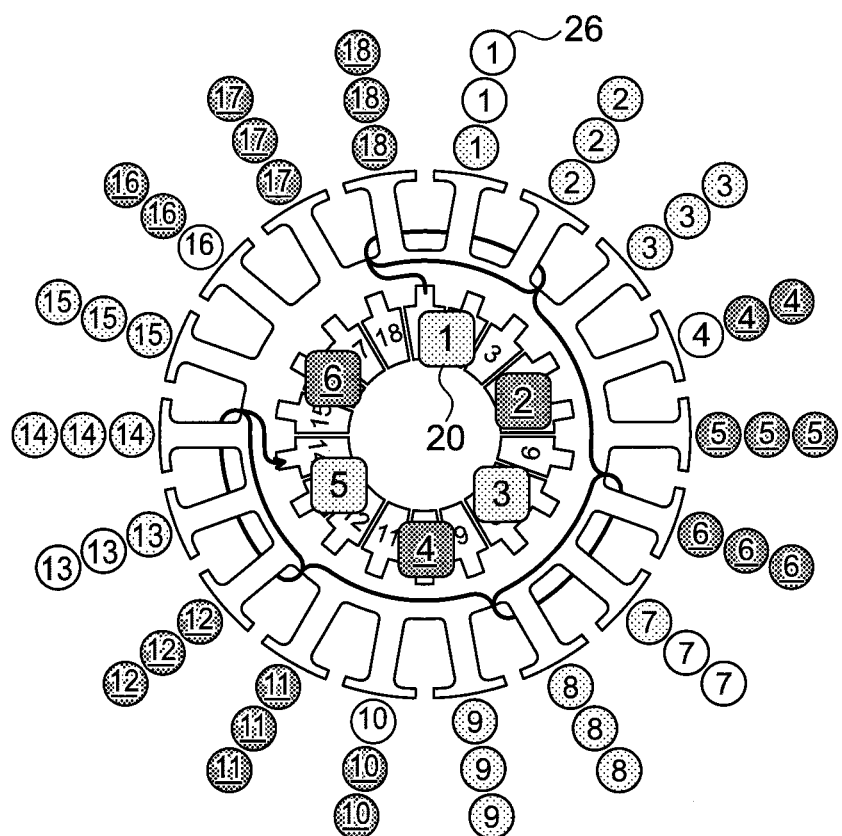
FIG. 13A is an explanatory diagram illustrating operation of a rotating armature of the present exemplary embodiment.
Figure 13B:
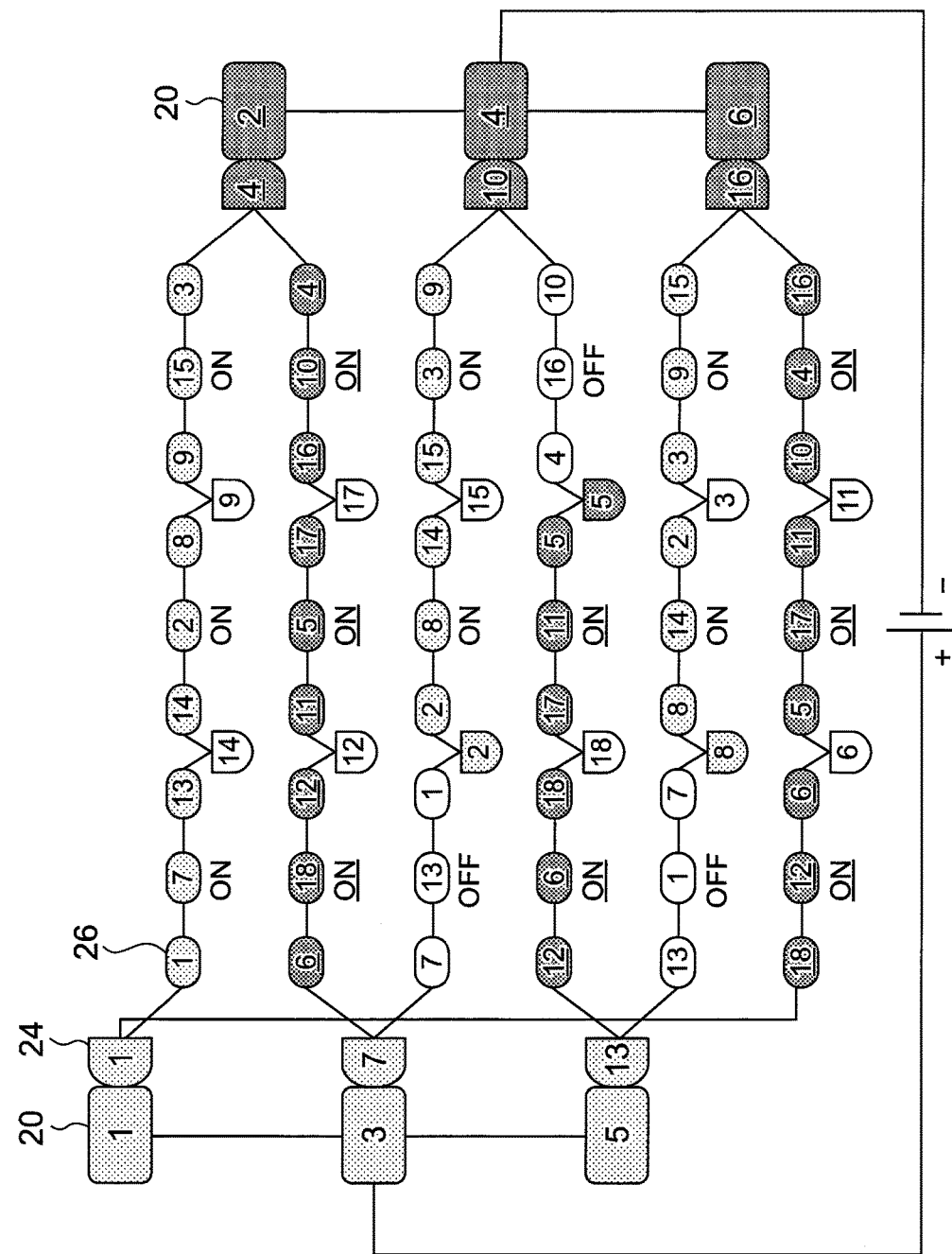
FIG. 13B is an explanatory diagram illustrating operation of a rotating armature of the present exemplary embodiment.

As the rotating armature 10 rotates, at a stage shown in FIG. 13A and FIG. 13B, the brush 3 straddles the segment 7 and the segment 8. In such a state, the segment 8 is positively poled, and the coil portions 1, 7 and 13 at the second layer are sandwiched between the same poled segments 24 and switched off. However, excitation balance is maintained.

(Phase: 0 Degree to 20 Degrees) [Step 4]

Figure 14A:
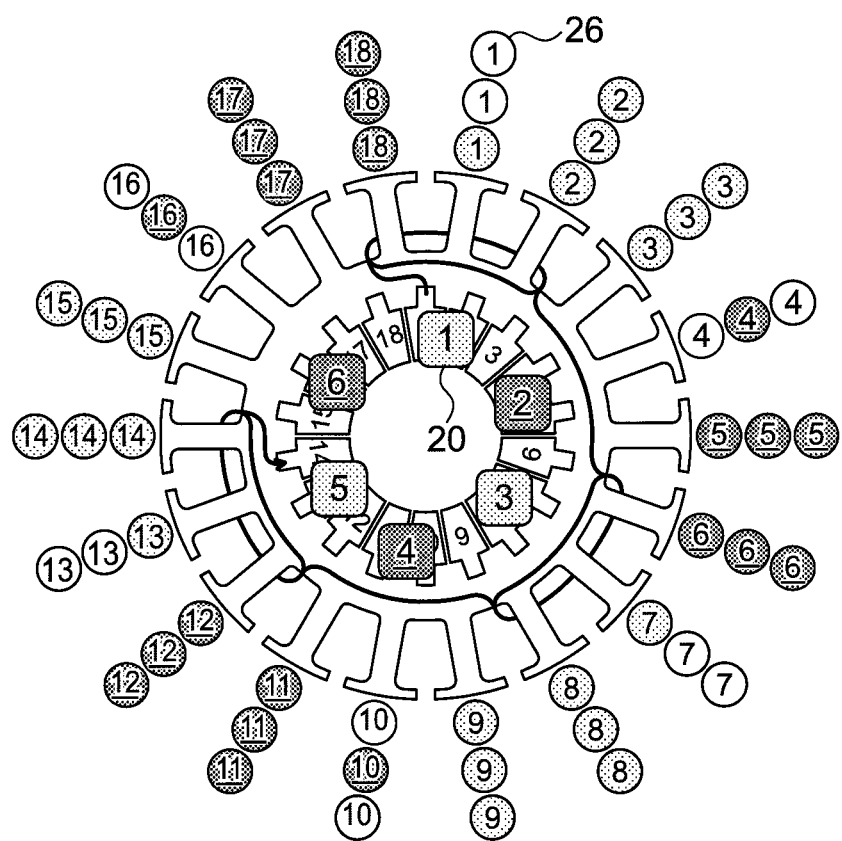
FIG. 14A is an explanatory diagram illustrating operation of a rotating armature of the present exemplary embodiment.
Figure 14B:
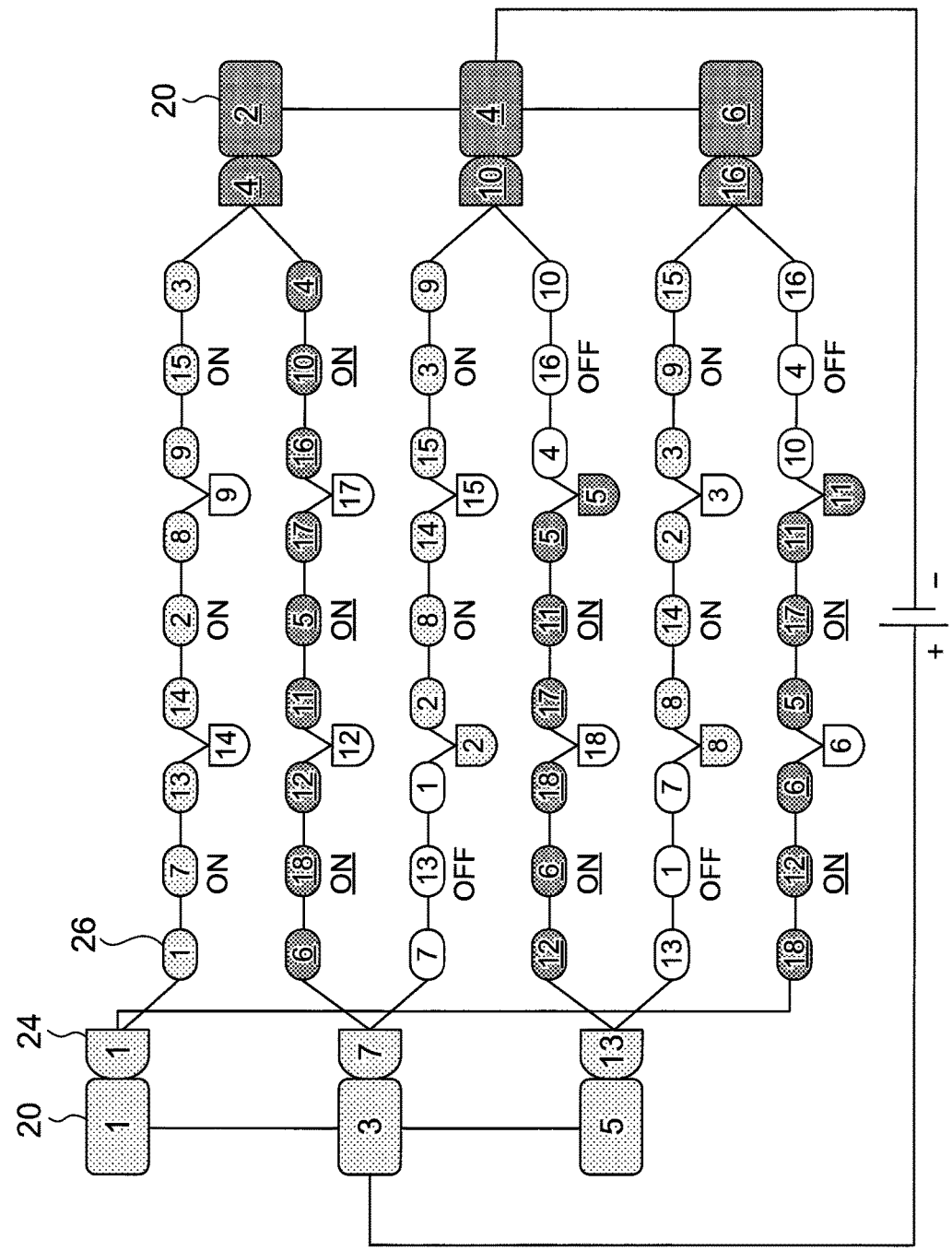
FIG. 14B is an explanatory diagram illustrating operation of a rotating armature of the present exemplary embodiment.

As the rotating armature 10 rotates, at a stage shown in FIG. 14A and FIG. 14B, the brush 4 straddles the segment 10 and the segment 11. In such a state, the segment 11 is negatively poled, and the coil portions 4, 10 and 16 at the third layer are sandwiched between the same poled segments 24 and switched off. However, excitation balance is maintained.

(Phase: 0 Degree to 20 Degrees) [Step 5]

Figure 15A:
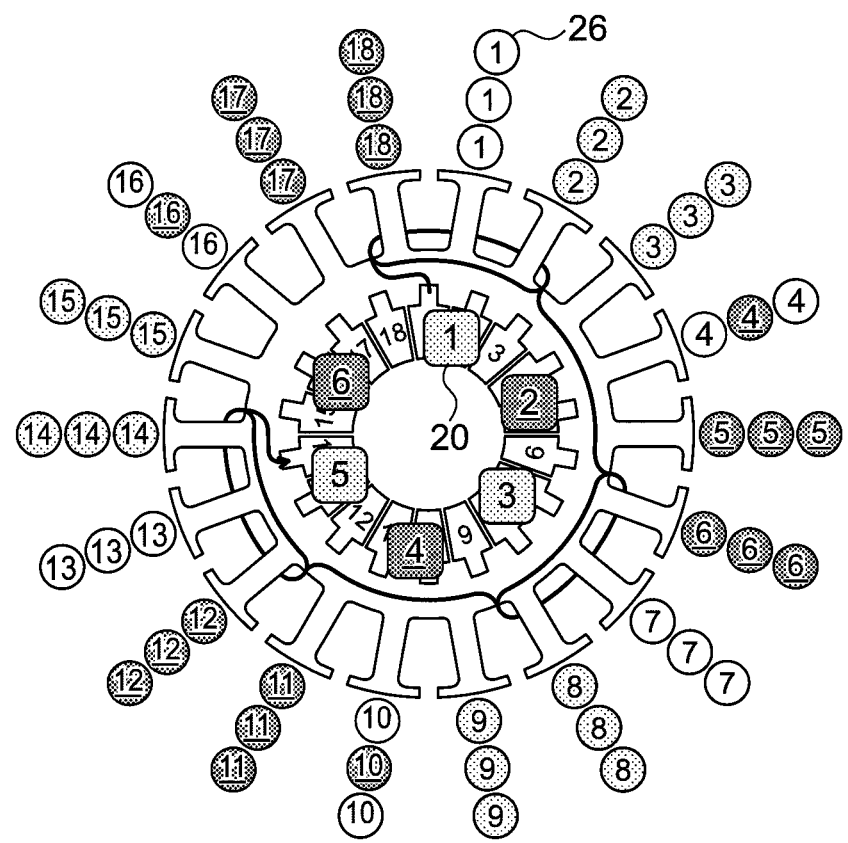
FIG. 15A is an explanatory diagram illustrating operation of a rotating armature of the present exemplary embodiment.

As the rotating armature 10 rotates, at a stage shown in FIG. 15A and FIG. 15B, the brush 5 straddles the segment 13 and the segment 14. In such a state, the segment 14 is positively poled, and the coil portions 1, 7 and 13 at the first layer are sandwiched between the same poled segments 24 and switched off. However, excitation balance is maintained.

(Phase: 0 Degree to 20 Degrees) [Step 6]

Figure 16A:
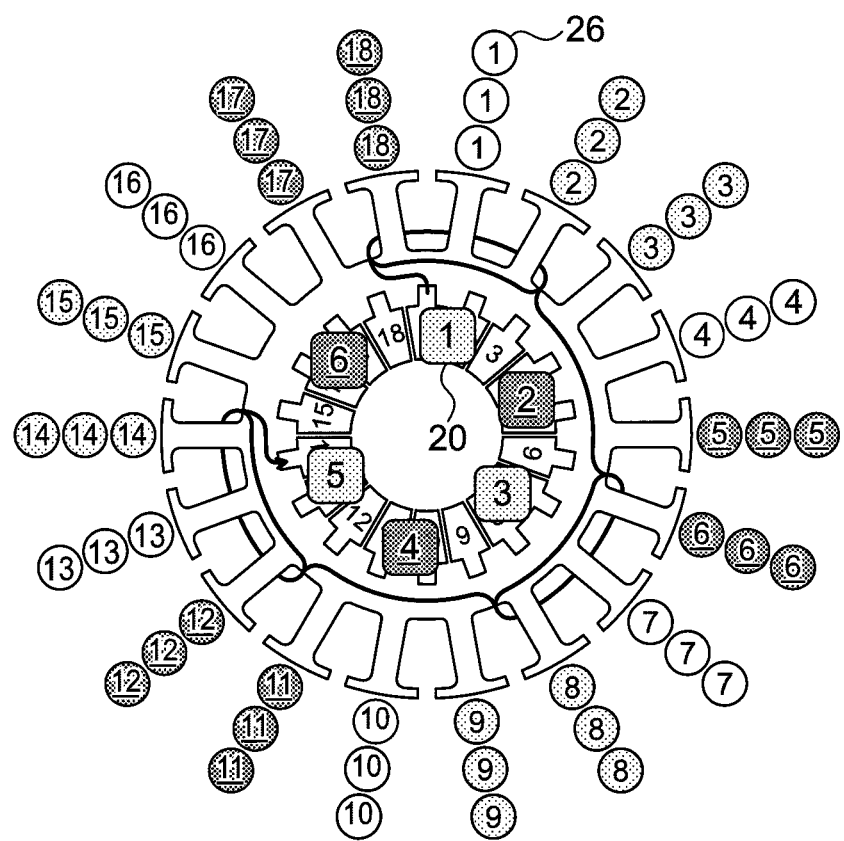
FIG. 16A is an explanatory diagram illustrating operation of a rotating armature of the present exemplary embodiment.
Figure 16B:
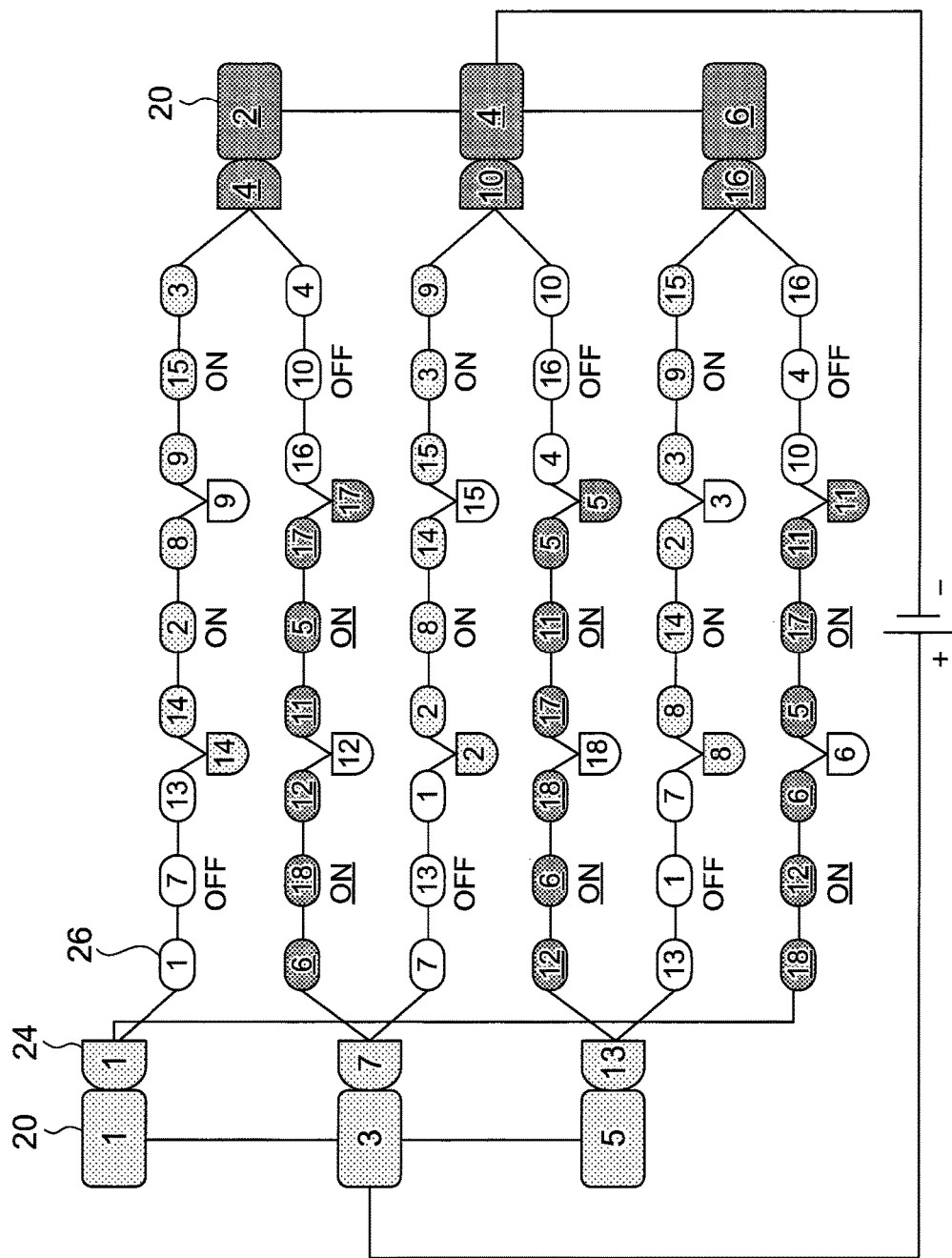
FIG. 16B is an explanatory diagram illustrating operation of a rotating armature of the present exemplary embodiment.

As the rotating armature 10 rotates, at a stage shown in FIG. 16A and FIG. 16B, the brush 6 straddles the segment 16 and the segment 17. In such a state, the segment 17 is negatively poled, and the coil portions 4, 10 and 16 at the second layer are sandwiched between the same poled segments 24 and switched off. However, excitation balance is maintained. In such a state, all brushes 1 to 6 straddles two of the segments 24 so that the total of eighteen coil portions 26 are switched off. However, excitation balance of the coil portions 26 which are switched on is maintained.

(Phase: 0 Degree to 20 Degrees) [Step 7]

Figure 17A:
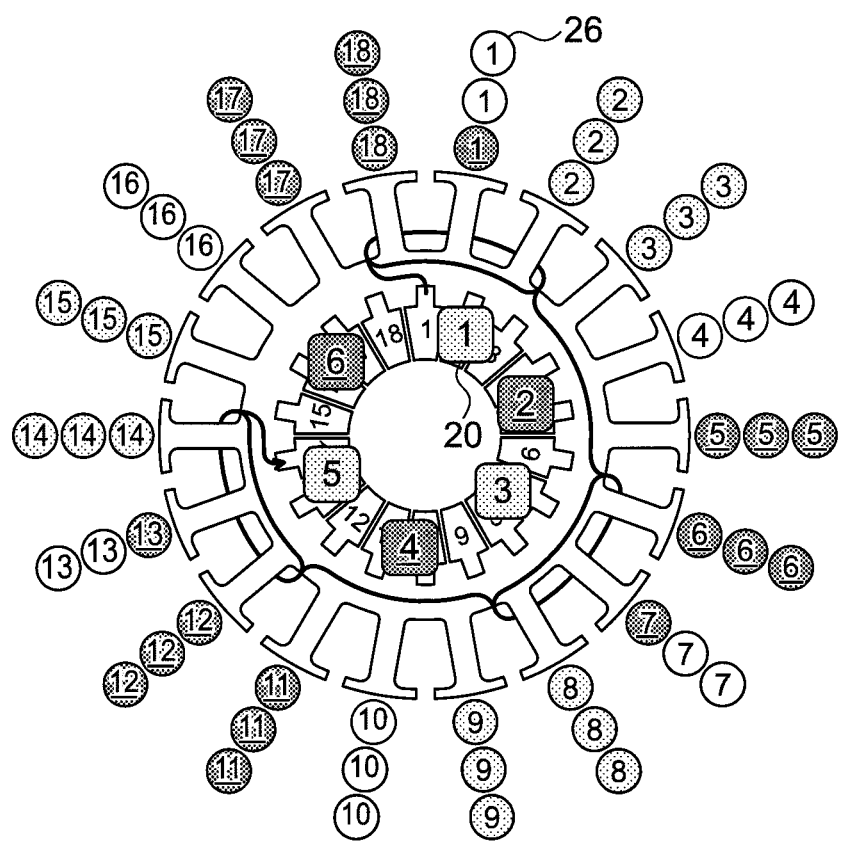
FIG. 17A is an explanatory diagram illustrating operation of a rotating armature of the present exemplary embodiment.
Figure 17B:
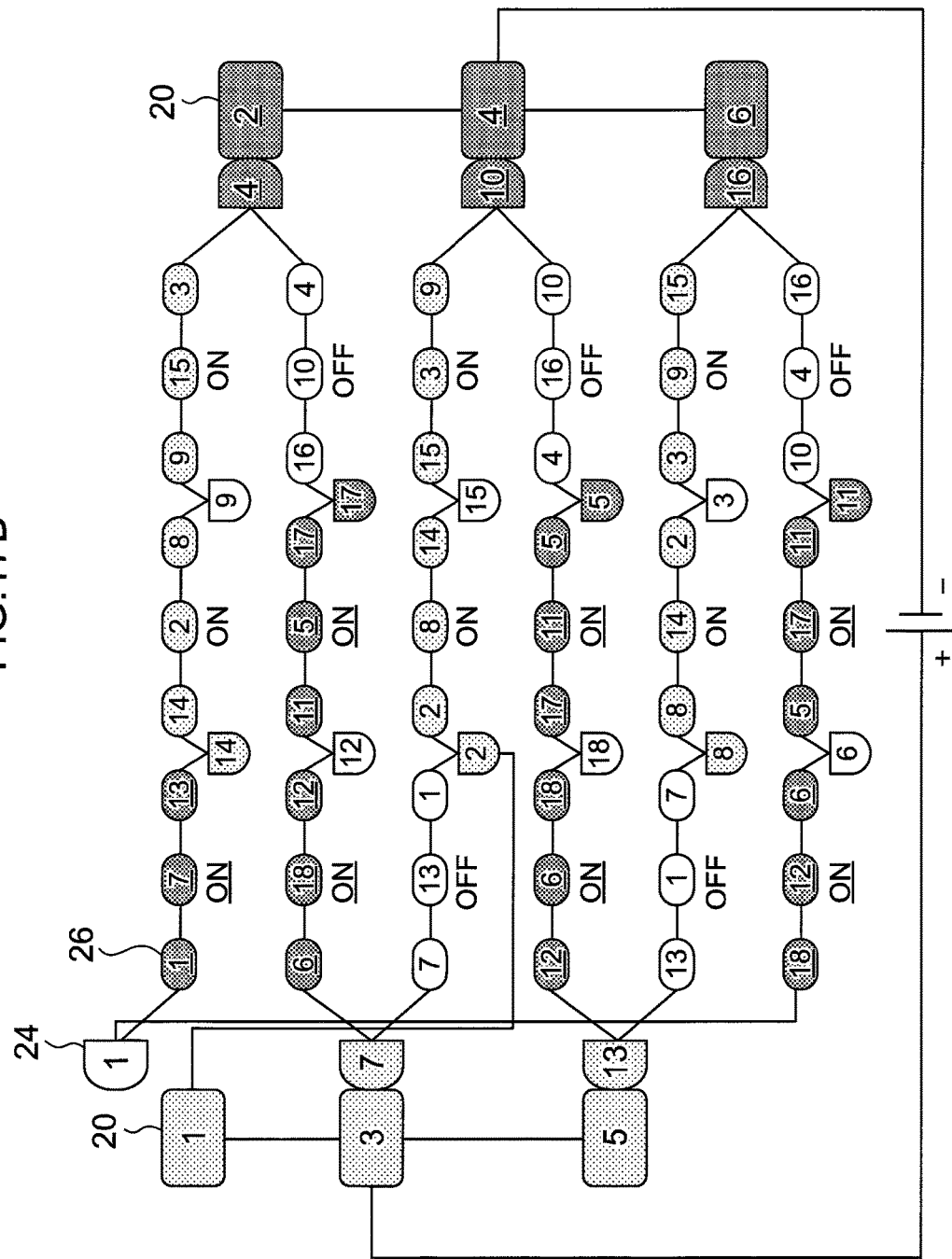
FIG. 17B is an explanatory diagram illustrating operation of a rotating armature of the present exemplary embodiment.

As the rotating armature 10 rotates further, at a stage shown in FIG. 17A and FIG. 17B, the brush 1 is distanced from the segment 1 and is singly in contact with the segment 2. In such a state, no current flows from the segment 1, and the coil portions 1, 7 and 13 at the first layer are switched on due to being reversely excited. However, excitation balance is maintained.

(Phase: 0 Degree to 20 Degrees) [Step 8]

Figure 18A:
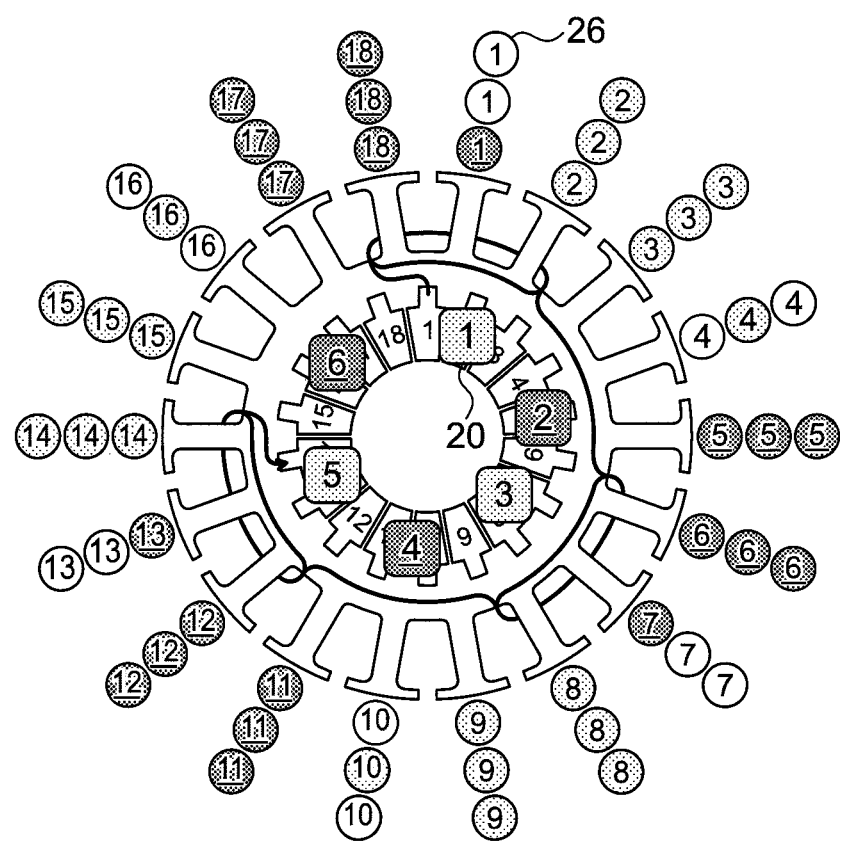
FIG. 18A is an explanatory diagram illustrating operation of a rotating armature of the present exemplary embodiment.
Figure 18B:
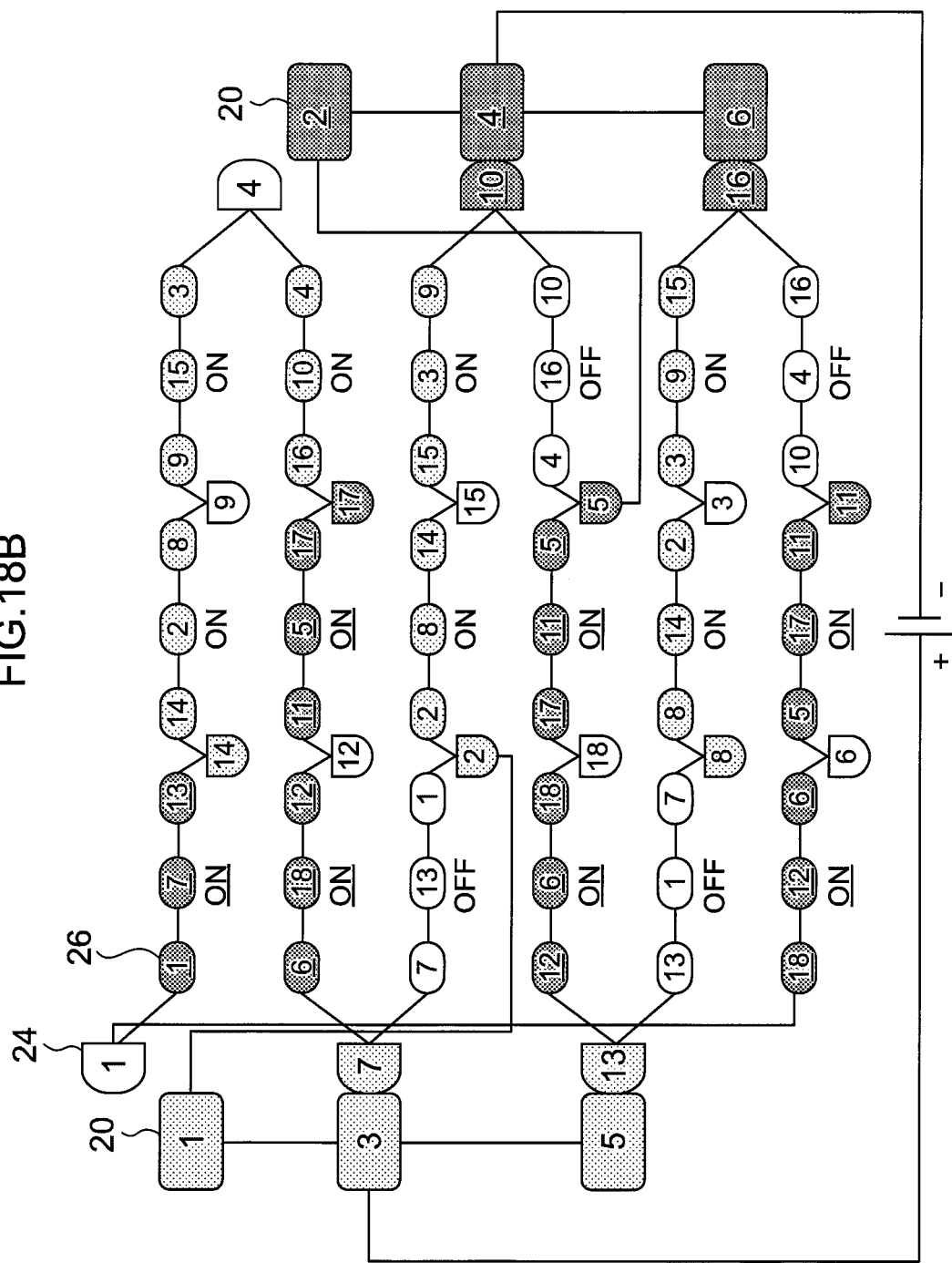
FIG. 18B is an explanatory diagram illustrating operation of a rotating armature of the present exemplary embodiment.

As the rotating armature 10 rotates further, at a stage shown in FIG. 18A and FIG. 18B, the brush 2 is distanced from the segment 4 and is singly in contact with the segment 5. In such a state, no current flows from the segment 4, and the coil portions 4, 10 and 16 at the second layer are switched on due to being reversely excited. However, excitation balance is maintained.

(Phase: 0 Degree to 20 Degrees) [Step 9]

Figure 19A:
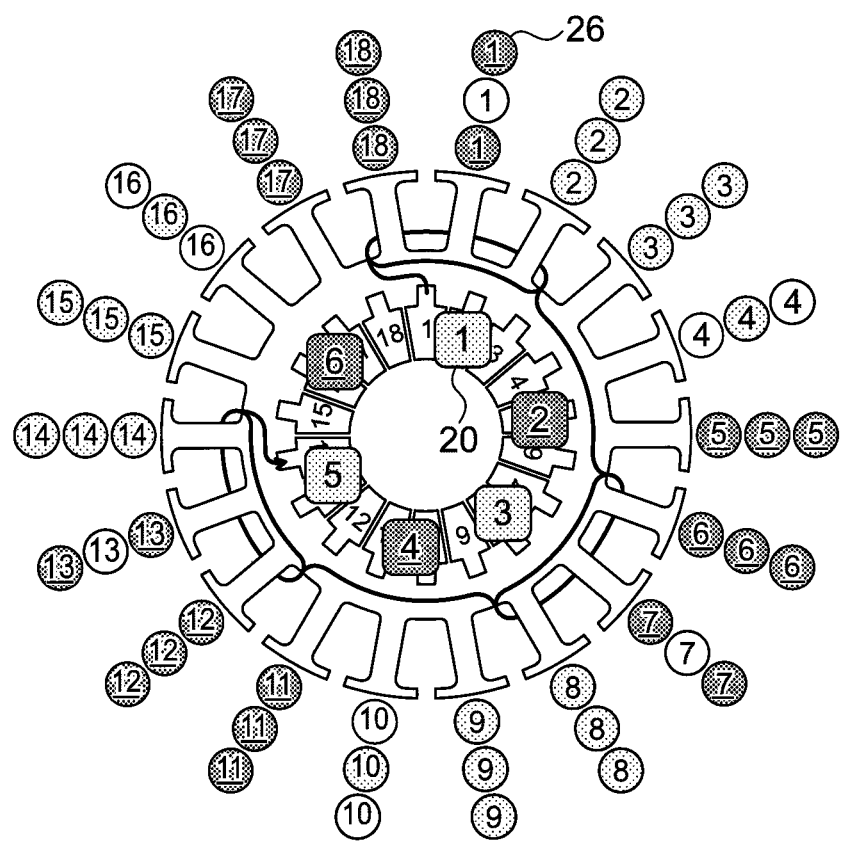
FIG. 19A is an explanatory diagram illustrating operation of a rotating armature of the present exemplary embodiment.
Figure 19B:
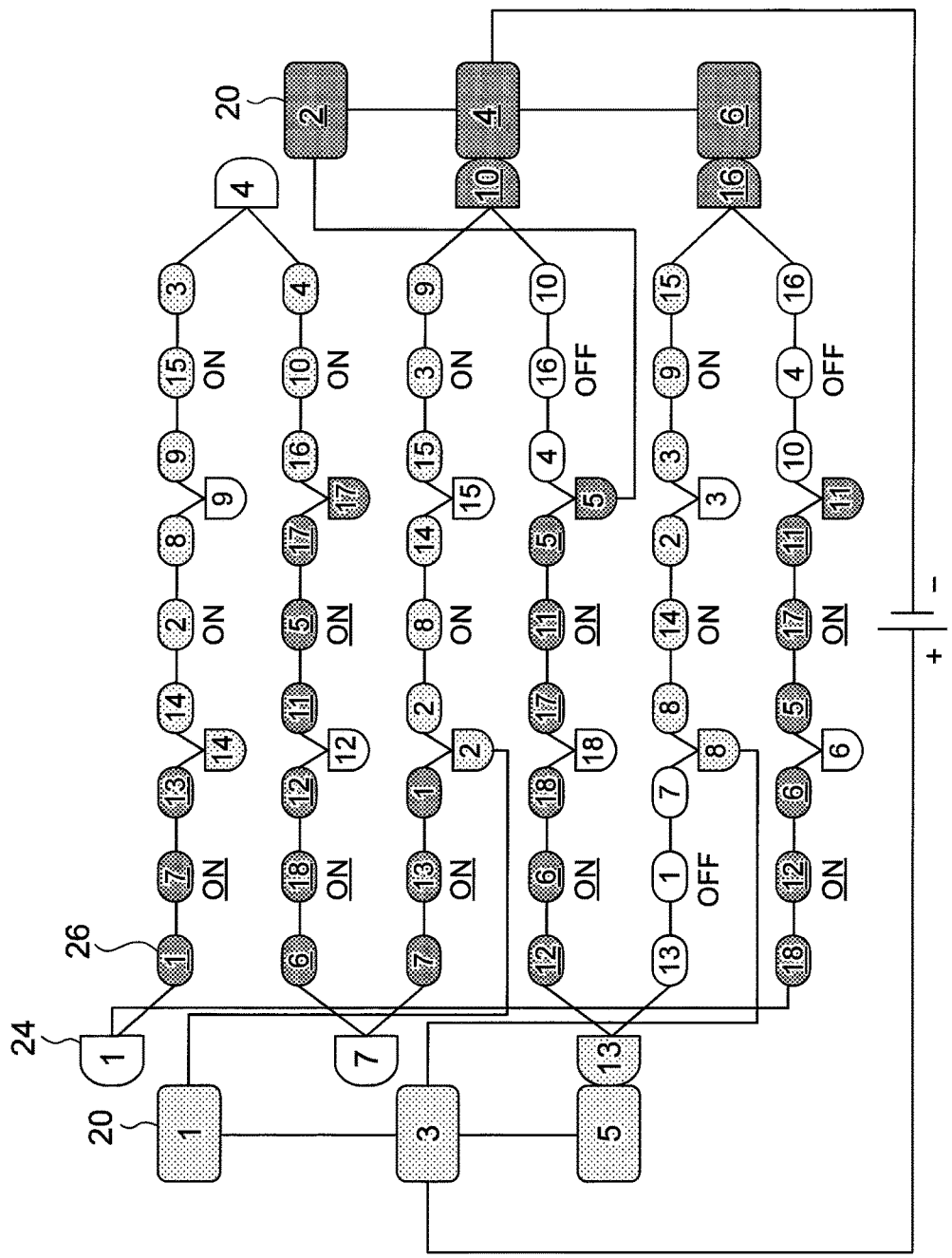
FIG. 19B is an explanatory diagram illustrating operation of a rotating armature of the present exemplary embodiment.

As the rotating armature 10 rotates further, at a stage shown in FIG. 19A and FIG. 19B, the brush 3 is distanced from the segment 7 and is singly in contact with the segment 8. In such a state, no current flows from the segment 7, and the coil portions 1, 7 and 13 at the third layer are switched on due to being reversely excited. However, excitation balance is maintained.

(Phase: 0 Degree to 20 Degrees) [Step 10]

Figure 20A:
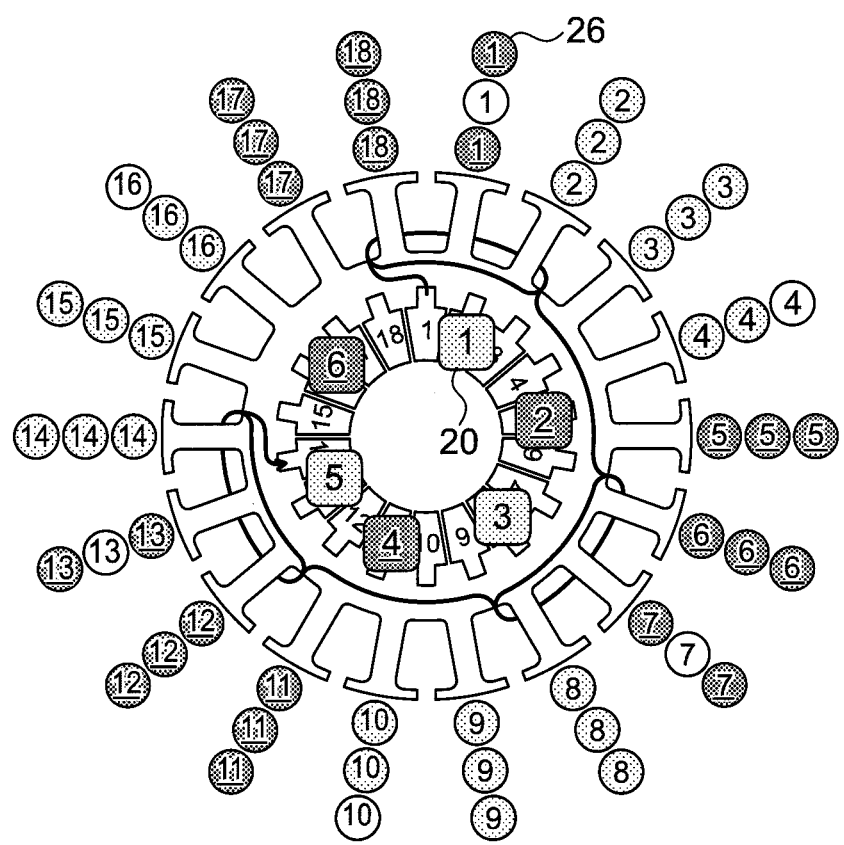
FIG. 20A is an explanatory diagram illustrating operation of a rotating armature of the present exemplary embodiment.
Figure 20B:
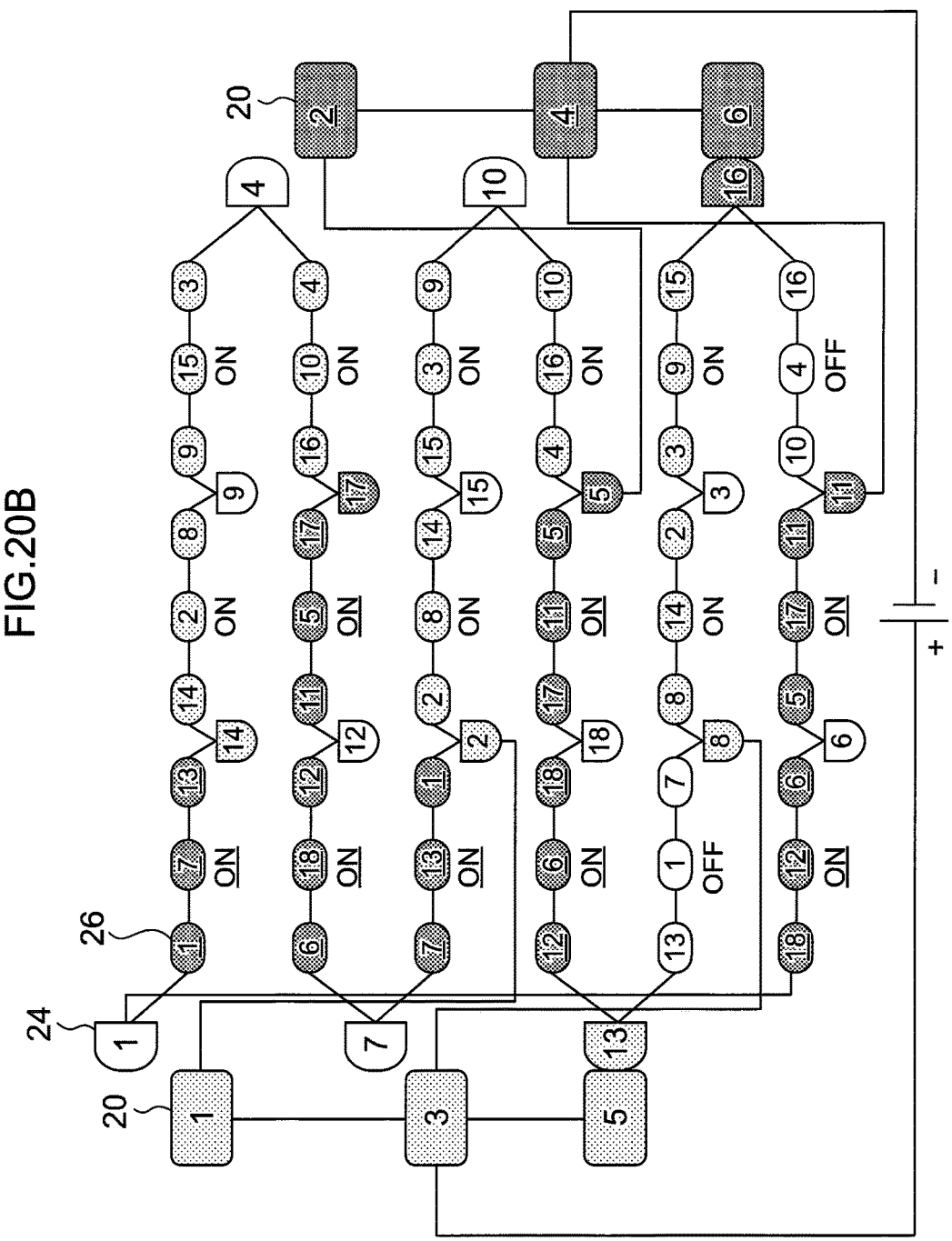
FIG. 20B is an explanatory diagram illustrating operation of a rotating armature of the present exemplary embodiment.

As the rotating armature 10 rotates further, at a stage shown in FIG. 20A and FIG. 20B, the brush 4 is distanced from the segment 10 and is singly in contact with the segment 11. In such a state, no current flows from the segment 10, and the coil portions 4, 10 and 16 at the first layer are switched on due to being reversely excited. However, excitation balance is maintained.

(Phase: 0 Degree to 20 Degrees) [Step 11]

Figure 21A:
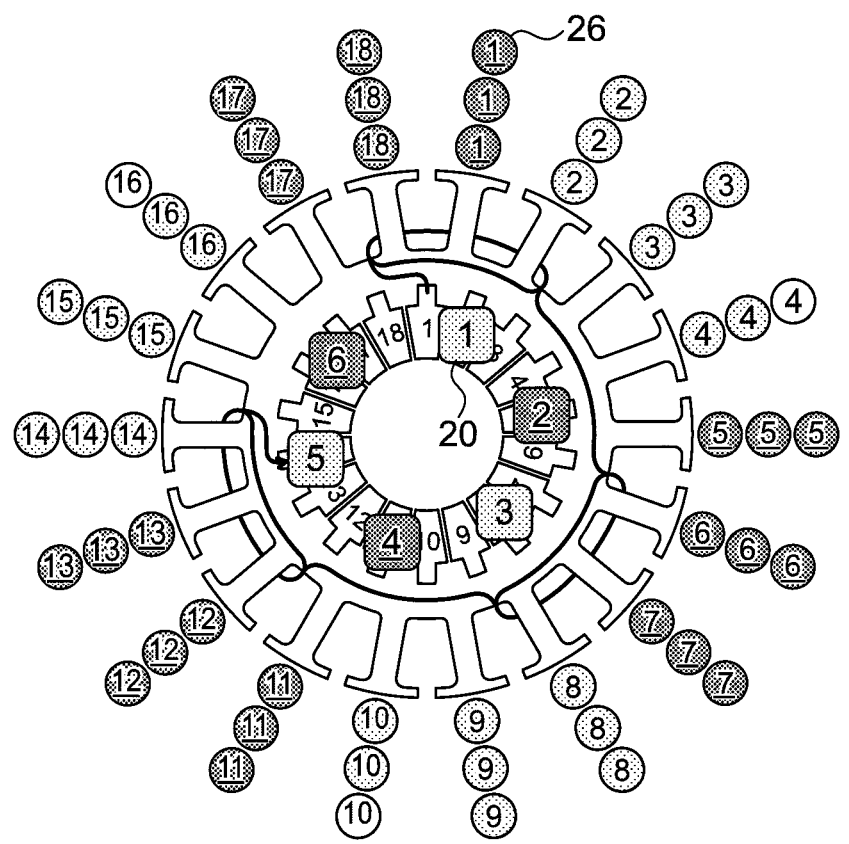
FIG. 21A is an explanatory diagram illustrating operation of a rotating armature of the present exemplary embodiment.
Figure 21B:
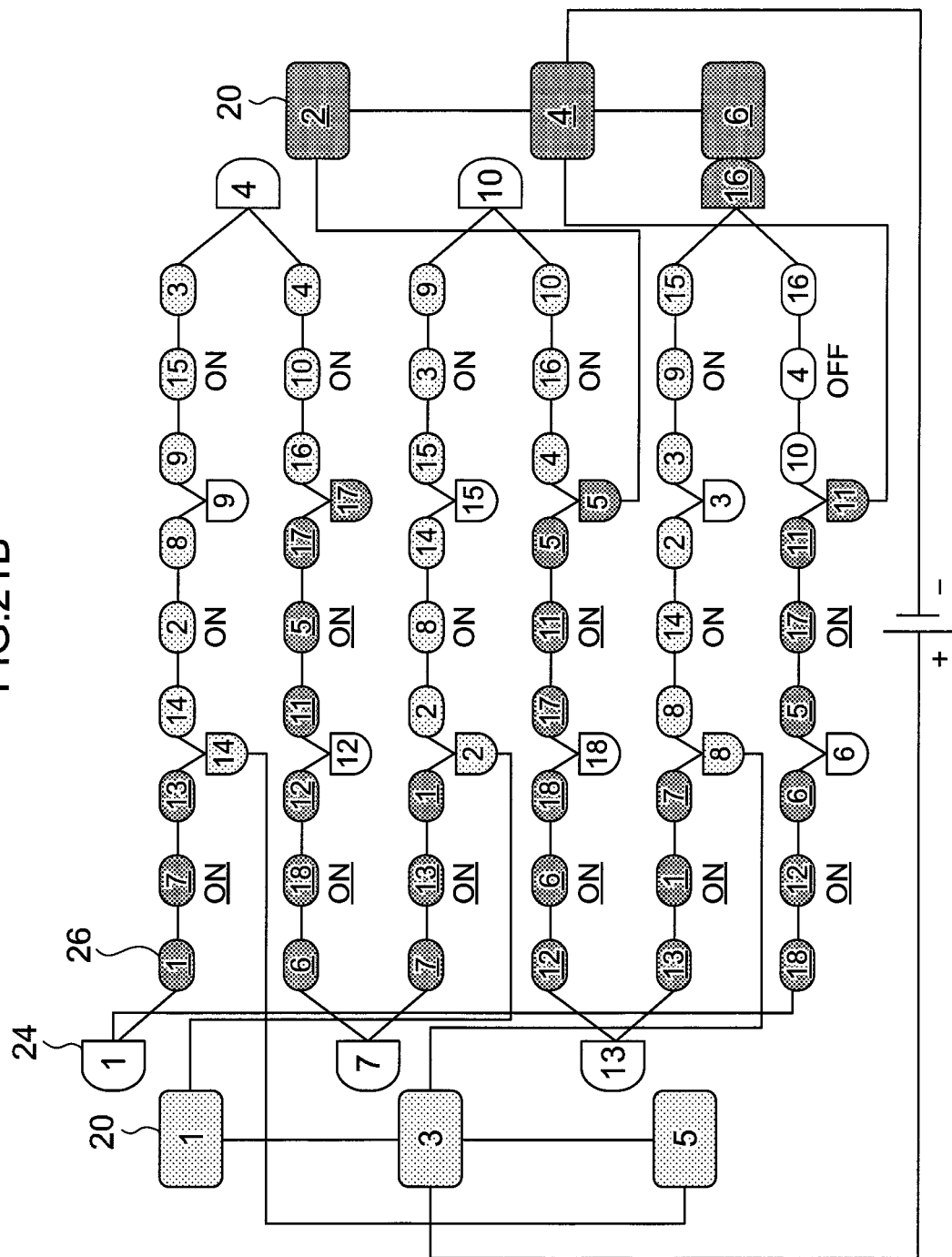
FIG. 21B is an explanatory diagram illustrating operation of a rotating armature of the present exemplary embodiment.

As the rotating armature 10 rotates further, at a stage shown in FIG. 21A and FIG. 21B, the brush 5 is distanced from the segment 13 and is singly in contact with the segment 14. In such a state, no current flows from the segment 13, and the coil portions 1, 7 and 13 at the second layer are switched on due to being reversely excited. However, excitation balance is maintained.

(Phase: 0 Degree to 20 Degrees) [Step 12]

Figure 22A:
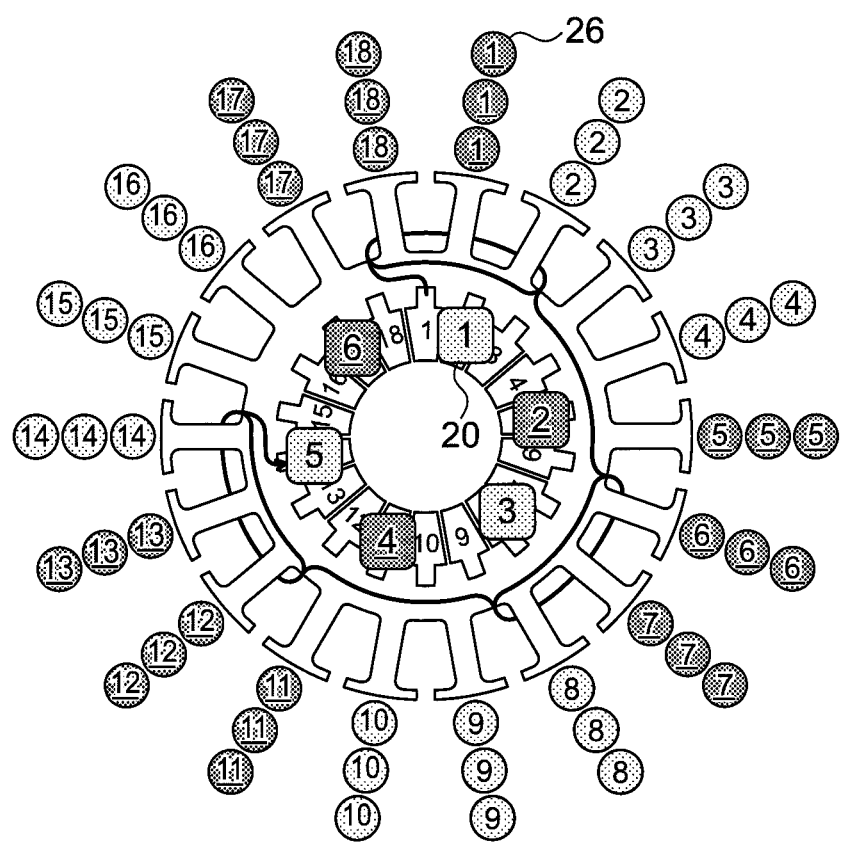
FIG. 22A is an explanatory diagram illustrating operation of a rotating armature of the present exemplary embodiment.
Figure 22B:
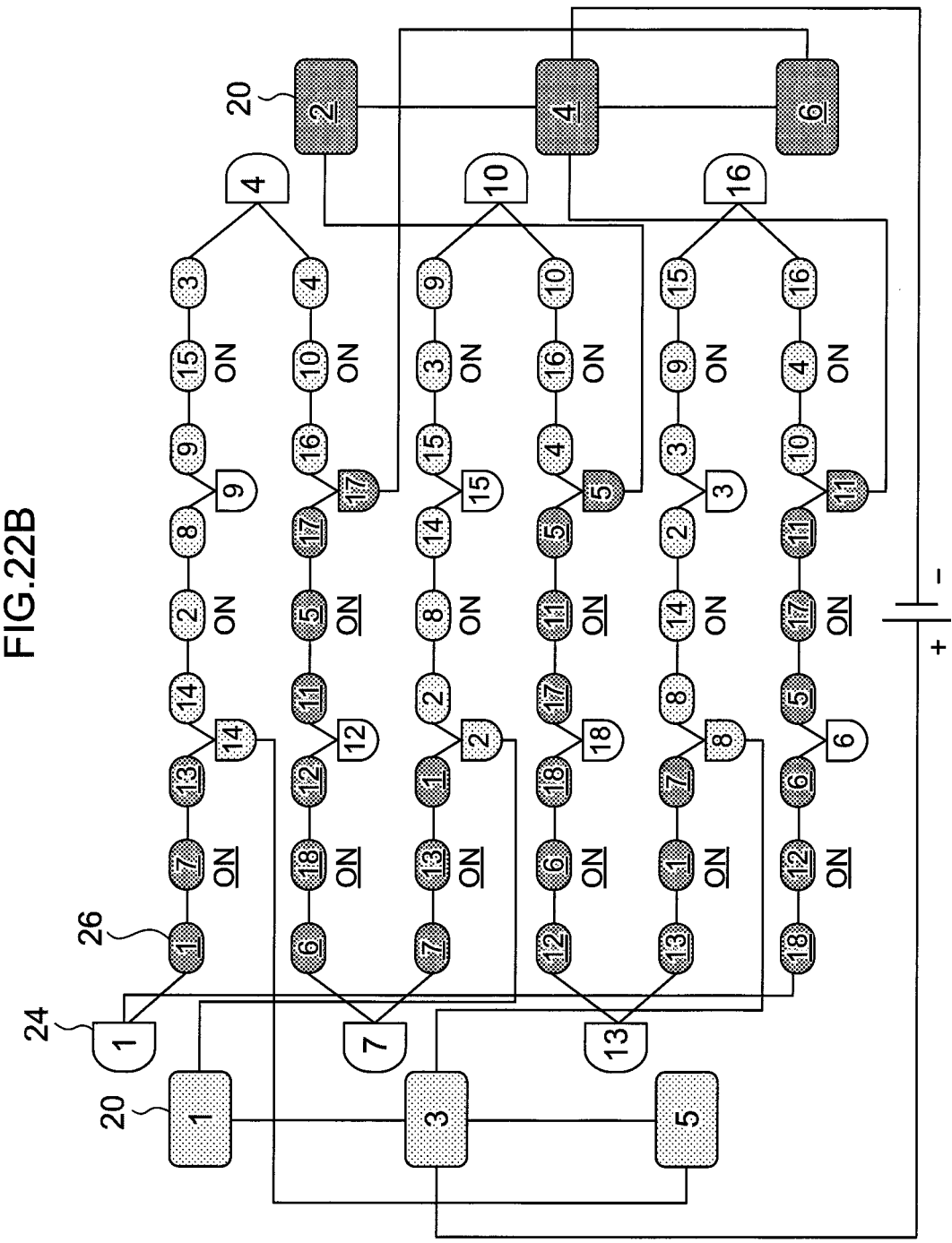
FIG. 22B is an explanatory diagram illustrating operation of a rotating armature of the present exemplary embodiment.

As the rotating armature 10 rotates further, at a stage shown in FIG. 22A and FIG. 22B, the brush 6 is distanced from the segment 16 and is singly in contact with the segment 17. In such a state, no current flows from the segment 16, and the coil portions 4, 10 and 16 at the third layer are switched on due to being reversely excited. However, excitation balance is maintained.

(Phase: 20 Degrees)

Figure 23A:
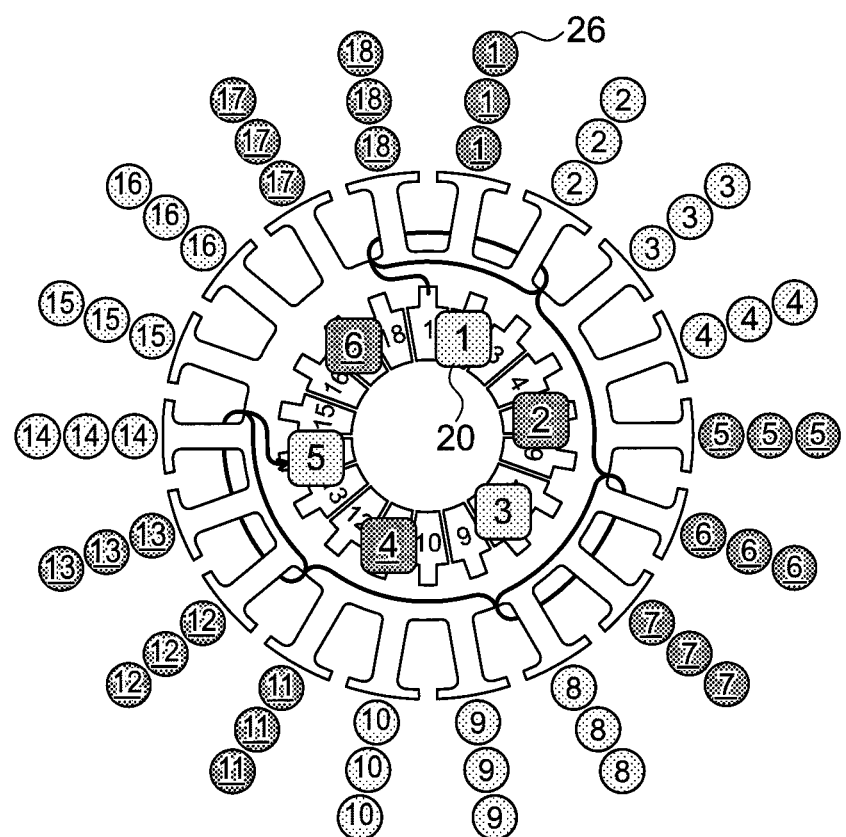
FIG. 23A is an explanatory diagram illustrating operation of a rotating armature of the present exemplary embodiment.

As the rotating armature 10 rotates further, at a stage shown in FIG. 23A and FIG. 23B, all brushes 1 to 6 are switched to the neighboring segments 24, and all fifty-four coil portions 26 are switched on. However, excitation balance is maintained.

(Phase: 40 Degrees)

Figure 24A:
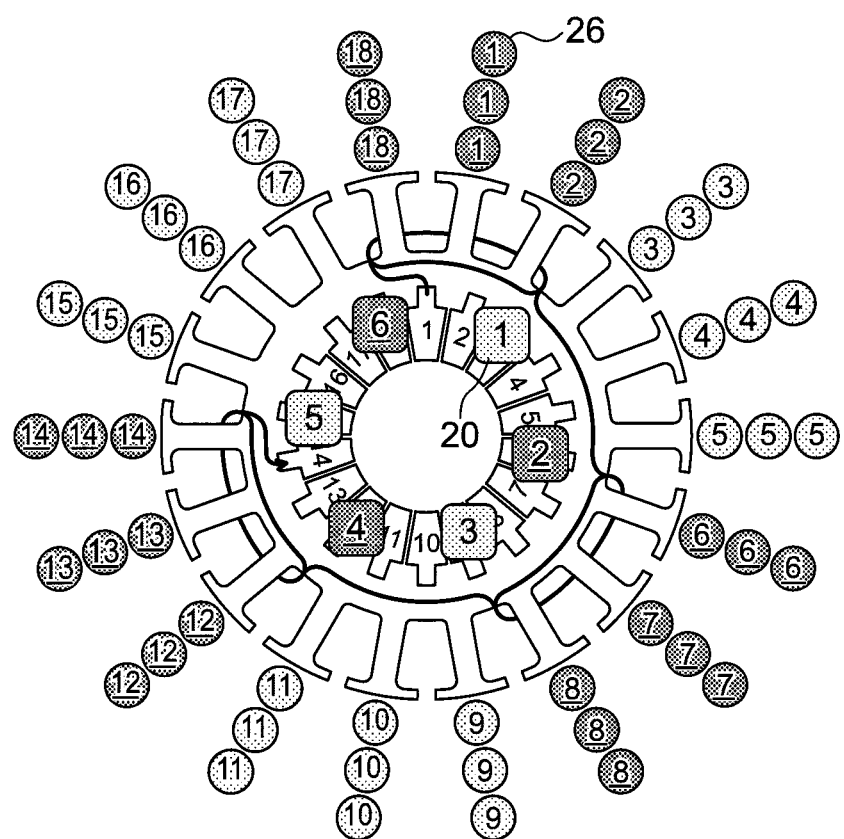
FIG. 24A is an explanatory diagram illustrating operation of a rotating armature of the present exemplary embodiment.
Figure 24B:
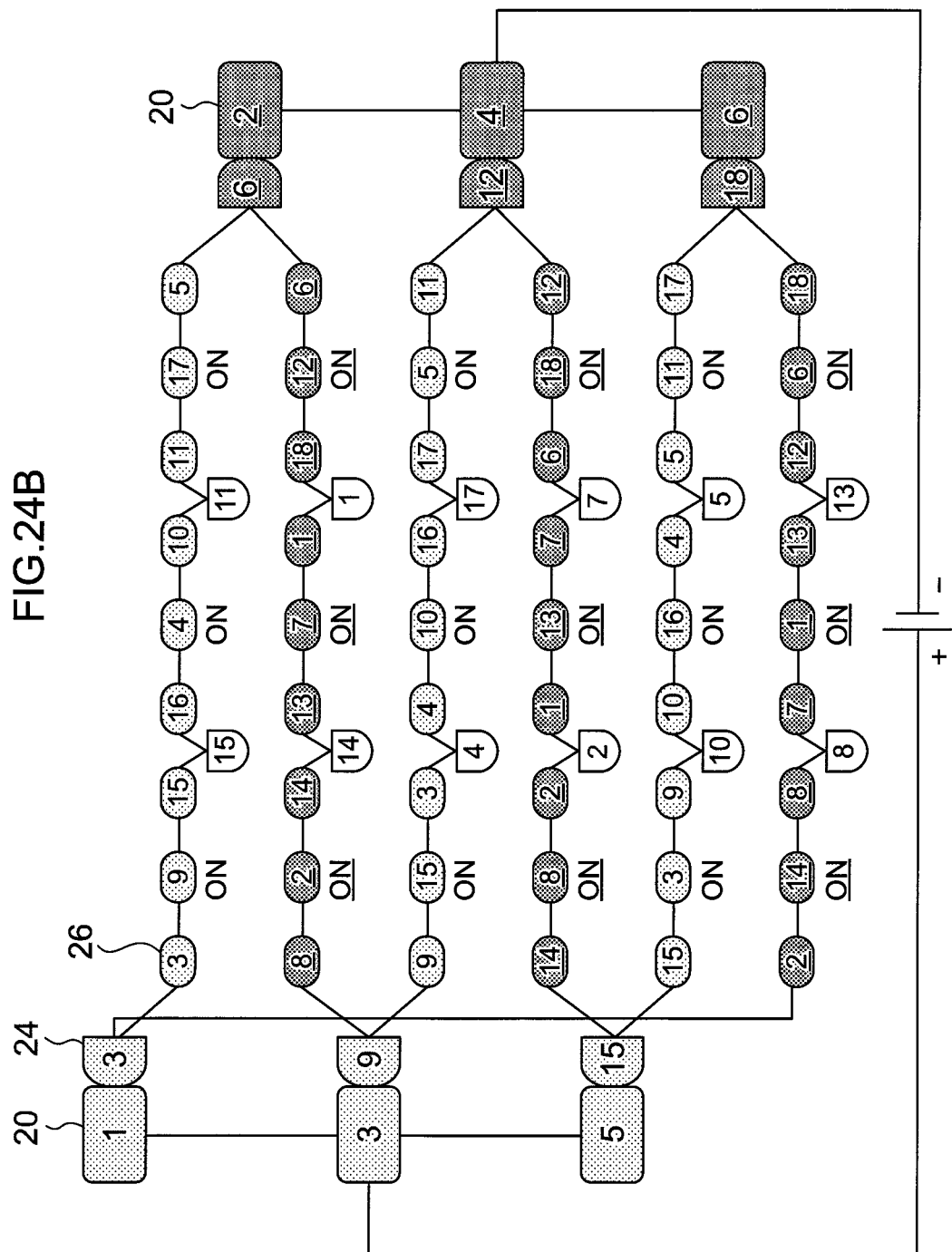
FIG. 24B is an explanatory diagram illustrating operation of a rotating armature of the present exemplary embodiment.

As the rotating armature 10 rotates further, at a stage shown in FIG. 24A and FIG. 24B, all brushes 1 to 6 are switched to the neighboring segments 24, and all fifty-four coil portions 26 are switched on. However, excitation balance is maintained.

(Phase: 60 Degrees)

Figure 25A:
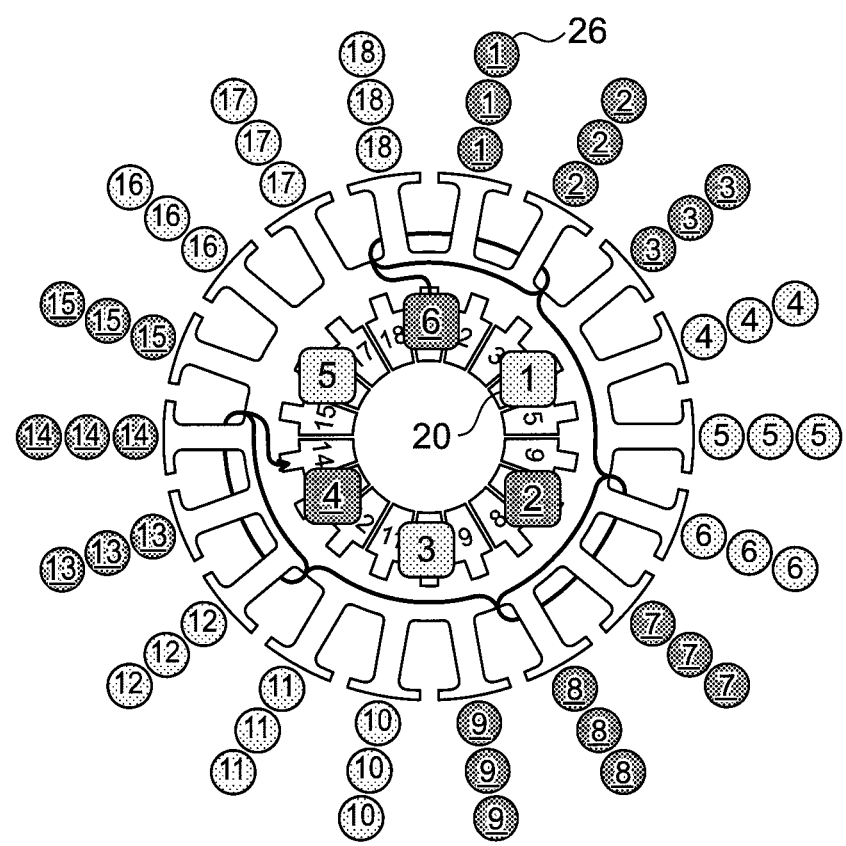
FIG. 25A is an explanatory diagram illustrating operation of a rotating armature of the present exemplary embodiment.

As the rotating armature 10 rotates further, at a stage shown in FIG. 25A and FIG. 25B, all brushes 1 to 6 are switched to the neighboring segments 24, and all fifty-four coil portions 26 are switched on. However, excitation balance is maintained.

FIG. 10 illustrates a wiring connection diagram of the brushes 20, the segments 24, and the coil portions 26 in the present exemplary embodiment. FIG. 11 illustrate the excitation states when current is passed through the coil portions 26 in the present exemplary embodiment. In the present exemplary embodiment, as illustrated in FIG. 11(1), the current between segment "1" (+) and segment "4" (−) is switched, then the current between segment "7" (+) and segment "10" (−) is switched, as illustrated in FIG. 11(2), and lastly the current between segment "13" (+) and segment "16" (−) is switched, as illustrated in FIG. 11(3).

Accordingly, in the present exemplary embodiment, since the plural coil portions 26 of each of the windings 16 are connected together in series, all of the coil portions 26 in each of the layers are excited at the same time around the circumferential direction, thereby suppressing an imbalance from arising in magnetic fields even when a misalignment occurs in commutation timing.

Since an imbalance in magnetic fields can be suppressed from arising even without employing voltage equalizer lines or voltage equalizer members, the need to provide dedicated winding equipment to apply voltage equalizer lines separately to the coil portions 26, these being the main windings, is eliminated, and an increase in the number of members can be suppressed. This thereby enables a reduction in costs in comparison to the first comparative example. Moreover, excessive current can be suppressed from occurring in the brushes, thereby enabling the lifespan of the brushes to be increased. Moreover, an imbalance in magnetic fields is suppressed from arising, thereby enabling a reduction in cogging torque.

Due to the plural coil portions 26 being connected together in series there are no voltage equalizer lines or voltage equalizer members, enabling a reduction in the number of wires entwined in the anchor claws of the segments 24 in comparison to the first comparative example. Moreover, there is no need to increase the external diameter of the commutator in order to increase the pitch of the segments 24, thereby enabling a reduction in size of the commutator, and therefore in the rotating armature. Since there are no voltage equalizer lines or voltage equalizer members, the operation to entwine the anchor claws of the segments 24 (the winding 16 joining process) is simplified, enabling an increase in the reliability of the rotating electric machine.

As illustrated in FIG. 3 to FIG. 5, each of the plural teeth 22 (each of the tooth groups made up of three teeth) around which the respective coil portion 26 are wound are wound with plural layers of the coil portions 26 (three layers in the present exemplary embodiment). Namely, the plural coil portions 26 illustrated in FIG. 3 configure the first layer, the plural coil portions 26 illustrated in FIG. 4 configure the second layer, and the plural coil portions 26 illustrated in FIG. 5 configure the third layer. This thereby enables, in comparison to cases in which the same number of turns of the coil portions 26 are all wound in one operation, the occurrence of dead space inside the slots to be reduced and a higher space factor to be achieved by an amount commensurate with dividing the coil portions 26 into plural layers, or enables the heights of coil ends to be lowered.

In particular, forming the windings 16 using a double flyer enables high space factor windings 16 to be formed with even higher density and less dead space, and enables a rotating electric machine to be achieved of reduced size and higher output.

The plural coil portions 26 configuring each layer are configured by plural first coil portions 26 formed in the first windings 16 (heavily shaded), and plural second coil portions 26 formed to the second windings 16 (lightly shaded). The first coil portions 26 and the second coil portions 26 are disposed alternately around the circumferential direction of the armature core. Moreover, one end portion of each of the first coil portions 26 (portions on the second coil portion 26 side end thereof) and another end portion of each of the second coil portions 26 (portions on the first coil portion 26 side ends thereof) are both inserted into the same slots between the plural teeth 22 as each other. This thereby enables dead space occurring inside the slots to be reduced even further and an even higher space factor to be achieved, or enables the coil ends to be lowered even further.

As illustrated in FIG. 1, in each of the plural windings 16, the coupling lines 28 (see also FIG. 2) that couple the plural coil portions 26 together are laid out in the opposite direction to the winding direction of the plural coil portions 26 (the arrow P direction). The coupling lines 28 are accordingly laid out over the shortest distance, thereby enabling ends of the coils to be lower, and therefore a reduction to be achieved in the size of the rotating armature, compared to the second comparative example.

Even when double winding with a double flyer, the coil portions 26 formed by windings from the same pack are wound continuously and disposed uniformly in directions trisecting the circumference of a circle. Accordingly, even if there is a weight imbalance due to left-right differences in weight of the winding material, or due to differences in length caused by the tension of the winding device or resistance along the path, any such weight imbalance is cancelled out (the advantageous effect of zigzagging winding is obtained in addition to the advantageous effects of voltage equalizer lines and cross winding).

Accordingly, in the present exemplary embodiment, the winding pattern devised for the windings 16 enables the compact high output, low-noise, and reduced vibration demanded of, for example, vehicle mounted rotating electric machines to be achieved at low cost, without the addition of voltage equalizer lines and a complex structure to the commutator, that have hitherto been necessary.

As long as the plural coil portions 26 that are connected together in series have the same number of turns as each other, the present exemplary embodiment is applicable, without loss of excitation balance, to specifications with various numbers of turns, by setting the number of turns of the coil portions 26 wound overlapping in the same slots of the respective layers as appropriate. Namely, for example, the equivalent of a conventional seventeen turn configuration can be achieved by setting the first layer with six turns, the second layer with six turns, and the third layer with five turns.

Next, explanation follows regarding modified examples of the present exemplary embodiment.

In the exemplary embodiment described above, as an example, the rotating electric machine M is configured with six poles and eighteen slots. However, the number of plural magnetic poles 18 and the number of slots may be different from the above, as long as the number of the slots between the plural teeth 22 is m×n, wherein m is the number of the plural magnetic poles 18 provided at the periphery of the armature core 12, and n is a natural number.

In the exemplary embodiment described above, each of the windings 16 includes three of the coil portions 26 connected together in series; however, the number of the coil portions 26 connected together in series in each of the windings 16 may be a number other than three.

In the exemplary embodiment described above, the plural coil portions 26 are configured in three layers; however configuration may be made with other than three layers.

Explanation has been given above regarding one exemplary embodiment of the present invention; however, the present invention is not limited to the above, and obviously, other than the above, various modifications may be implemented within a range not departing from the spirit of the present invention.

EXPLANATION OF THE REFERENCE NUMERALS

10 rotating armature
12 armature core
14 commutator
16 winding
18 magnetic poles
20 brushes
22 teeth
24 segment
26 coil portion
28 coupling line
M rotating electric machine

What is claimed is:

1. A rotating armature comprising:
    an armature core including a plurality of teeth disposed at uniform angle intervals, the plurality of teeth being the total number of teeth present on the armature core;
    a commutator that is disposed coaxially to the armature core and that includes a plurality of segments arranged around a circumferential direction; and
    a plurality of coil portions that are each wound a plurality of times straddling a set of three teeth out of the plurality of teeth, three layers of coil portions being formed at the same set of three teeth such that a sum of a number of turns in a first layer, a number of turns in a second layer and a number of turns in a third layer equals a total number of turns of the coil portions wound onto the same set of three teeth, and a set of teeth on which each of the plurality of coil portions is wound being sequentially shifted in slot one by one along the circumferential direction; wherein,
    a number of slots between the plurality of teeth is m×n, when m is the number of a plurality of magnetic poles provided at a periphery of the armature core, and n is a natural number;
    in a plurality of windings that form the plurality of coil portions, a plurality of individual coil portions that, out of the plurality of coil portions, are disposed at uniform intervals around the circumferential direction of the armature core and are connected together in series are formed in each of the windings; and
    each of the windings is connected to one segment out of the plurality of segments, and to another segment that has the same phase as the one segment out of the plurality of segments; and wherein
    the plurality of coil portions are configured by a plurality of first coil portions formed in a first winding having same electric current flow direction, and a plurality of second coil portions formed in a second winding having same electric current flow direction, the first winding being distinct from and not connected to the second winding; and
    the first coil portions and the second coil portions are disposed alternately around the circumferential direction of the armature core with respective ends thereof being disposed adjacent to each other, the adjacently disposed respective ends of the first coil portion and the second coil portion being inserted in the same slot.

2. The rotating armature of claim 1, wherein in each of the plurality of windings, a coupling line coupling together the plurality of individual coil portions is laid out in the opposite direction along which a coupling line coupling together the plurality of individual coil portion is laid out is opposite to a direction in which the plurality of individual coil portions is wound.

3. A rotating electric machine comprising:
    the rotating armature of claim 1;
    the plurality of magnetic poles provided at the periphery of the armature core; and
    a plurality of brushes that brush against the plurality of segments.

4. A rotating armature manufacturing method for a rotating armature including
    an armature core including a plurality of teeth disposed at uniform angle intervals,
    a commutator that is disposed coaxially to the armature core and that includes a plurality of segments arranged around a circumferential direction, and
    a plurality of coil portions that are each wound a plurality of times straddling a set of three teeth out of the plurality of teeth, three layers of coil portions being formed at the same set of three teeth such that a sum of a number of turns in a first layer, a number of turns in a second layer and a number of turns in a third layer equals a total number of turns of the coil portions wound onto the same set of three teeth, and a set of teeth on which each of the plurality of coil portions is wound being sequentially shifted in slot one by one along the circumferential direction, wherein,
    a number of slots between the plurality of teeth is m×n, when m is the number of a plurality of magnetic poles provided at a periphery of the armature core, and n is a natural number,
    the plurality of coil portions are configured by a plurality of first coil portions formed in a first winding having same electric current flow direction, and a plurality of second coil portions formed in a second winding having same electric current flow direction, the first winding being distinct from and not connected to the second winding; and
    the first coil portions and the second coil portions are disposed alternately around the circumferential direction of the armature core with respective ends of thereof being disposed adjacent to each other, the adjacently disposed respective ends of the first coil portion and the second coil portion being inserted in the same slot, and
    the rotating armature manufacturing method comprises:
    forming a plurality of individual coil portions such that, in a plurality of windings that form the plurality of coil portions, a plurality of individual coil portions that, out of the plurality of coil portions, are disposed at uniform intervals around the circumferential direction of the armature core and are connected together in series are formed in each of the windings; and
    connecting each of the windings including the plurality of individual coil portions such that one segment out of the plurality of segments is connected to another segment that has the same phase as the one segment out of the plurality of segments.

5. The rotating armature manufacturing method of claim 4, wherein in each of the plurality of windings, a coupling line coupling together the plurality of individual coil portions is laid out in the opposite direction to a winding direction of the plurality of individual coil portions.

\* \* \* \* \*